US009274738B2

(12) United States Patent
Naruse

(10) Patent No.: US 9,274,738 B2
(45) Date of Patent: Mar. 1, 2016

(54) INFORMATION PROCESSING APPARATUS, CONTROL METHOD AND STORAGE MEDIUM STORING PROGRAM FOR SHORT DISTANCE WIRELESS COMMUNICATION

(71) Applicant: CANON KABUSHIKI KAISHA, Tokyo (JP)

(72) Inventor: Taketomo Naruse, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/772,559

(22) Filed: Feb. 21, 2013

(65) Prior Publication Data
US 2013/0229685 A1 Sep. 5, 2013

(30) Foreign Application Priority Data

Mar. 5, 2012 (JP) ................. 2012-048621

(51) Int. Cl.
G06F 3/12 (2006.01)
H04N 1/00 (2006.01)
(52) U.S. Cl.
CPC ............ *G06F 3/1294* (2013.01); *G06F 3/1207* (2013.01); *G06F 3/1236* (2013.01); *G06F 3/1292* (2013.01); *H04N 1/00204* (2013.01); *H04N 1/00244* (2013.01); *H04N 2201/006* (2013.01); *H04N 2201/0015* (2013.01); *H04N 2201/0039* (2013.01); *H04N 2201/0041* (2013.01); *H04N 2201/0044* (2013.01); *H04N 2201/0094* (2013.01); *H04N 2201/3219* (2013.01); *H04N 2201/3278* (2013.01)
(58) Field of Classification Search
CPC .................................................. G06F 3/1292
See application file for complete search history.

(56) References Cited

U.S. PATENT DOCUMENTS 8,896,868 B2* 11/2014 Daos et al. ................... 358/1.15
2003/0142345 A1* 7/2003 Bunn et al. ................... 358/1.15
2006/0165456 A1* 7/2006 Matsunaga et al. ............. 400/62

(Continued)

FOREIGN PATENT DOCUMENTS

JP 2004-209907 7/2004 ............... B41J 29/00
JP 2006-186942 7/2006 ............ H04M 11/00

(Continued)

OTHER PUBLICATIONS

U.S. Appl. No. 13/777,446, filed Feb. 26, 2013.

(Continued)

*Primary Examiner* — King Poon
*Assistant Examiner* — Vincent Peren
(74) *Attorney, Agent, or Firm* — Fitzpatrick, Cella, Harper & Scinto

(57) ABSTRACT

In an information processing apparatus capable of performing communication using each of a plurality of communication methods, information used to communicate with an external apparatus of the information processing apparatus by a second communication method among the plurality of communication methods is received from the external apparatus by a first communication method among the plurality of communication methods. The external apparatus is notified, by the second communication method based on the received information, of information about execution of predetermined processing in accordance with a result obtained by determining the status of the communication with the external apparatus by the first communication method.

17 Claims, 23 Drawing Sheets

(56) References Cited

U.S. PATENT DOCUMENTS

| | | | |
|---|---|---|---|
| 2009/0303528 A1* | 12/2009 | Takeuchi et al. | 358/1.15 |
| 2010/0131691 A1* | 5/2010 | Chatterjee et al. | 710/303 |
| 2011/0065384 A1* | 3/2011 | Cader et al. | 455/41.1 |
| 2011/0134465 A1* | 6/2011 | Gha | 358/1.15 |
| 2011/0292445 A1* | 12/2011 | Kato | 358/1.15 |
| 2012/0271960 A1* | 10/2012 | Geetha et al. | 709/229 |
| 2012/0300245 A1* | 11/2012 | Chatierjee et al. | 358/1.14 |
| 2013/0094047 A1* | 4/2013 | Bailey et al. | 358/1.14 |

FOREIGN PATENT DOCUMENTS

| | | | | |
|---|---|---|---|---|
| JP | 2007-166538 A | | 6/2007 | |
| JP | 2009-147901 | * | 7/2009 | |
| JP | 2010-041563 | | 2/2010 | B41J 29/00 |

OTHER PUBLICATIONS

U.S. Appl. No. 13/777,651, filed Feb. 26, 2013.

\* cited by examiner

OUTSIDE DRAWING OF MFP

PLAN VIEW OF MFP

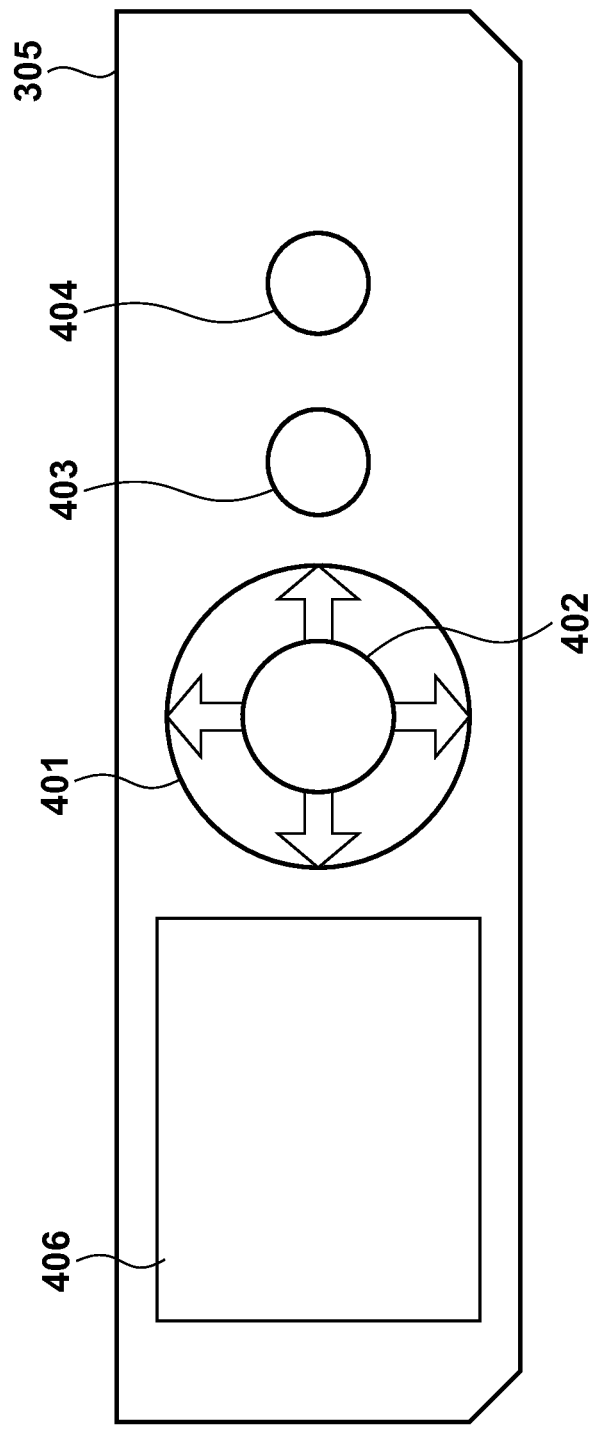

F I G. 10
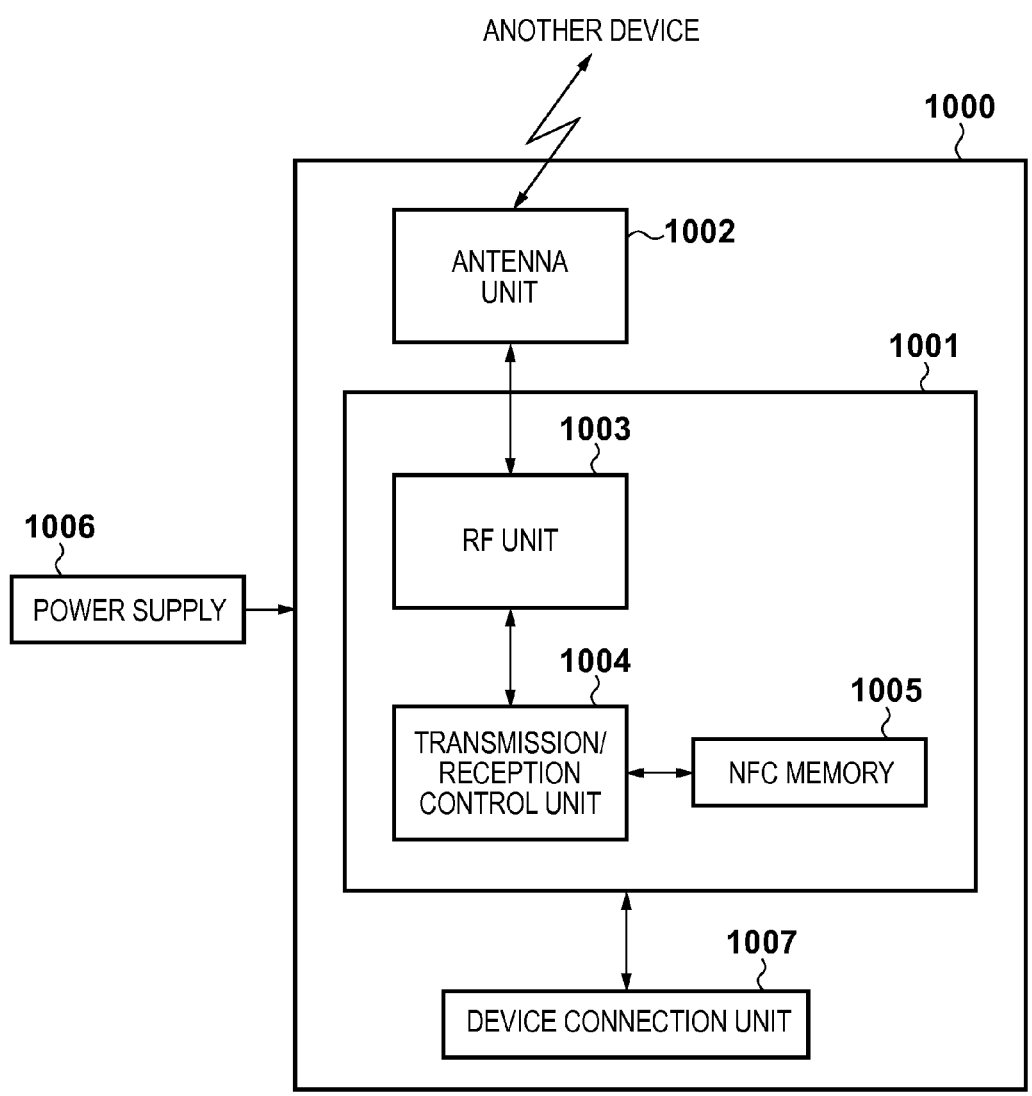

PRINT JOB CONFORMATION SCREEN

READING JOB CONFORMATION SCREEN

PRINTER SELECTION SCREEN

PRINTING STATE DISPLAY SCREEN

F I G. 14
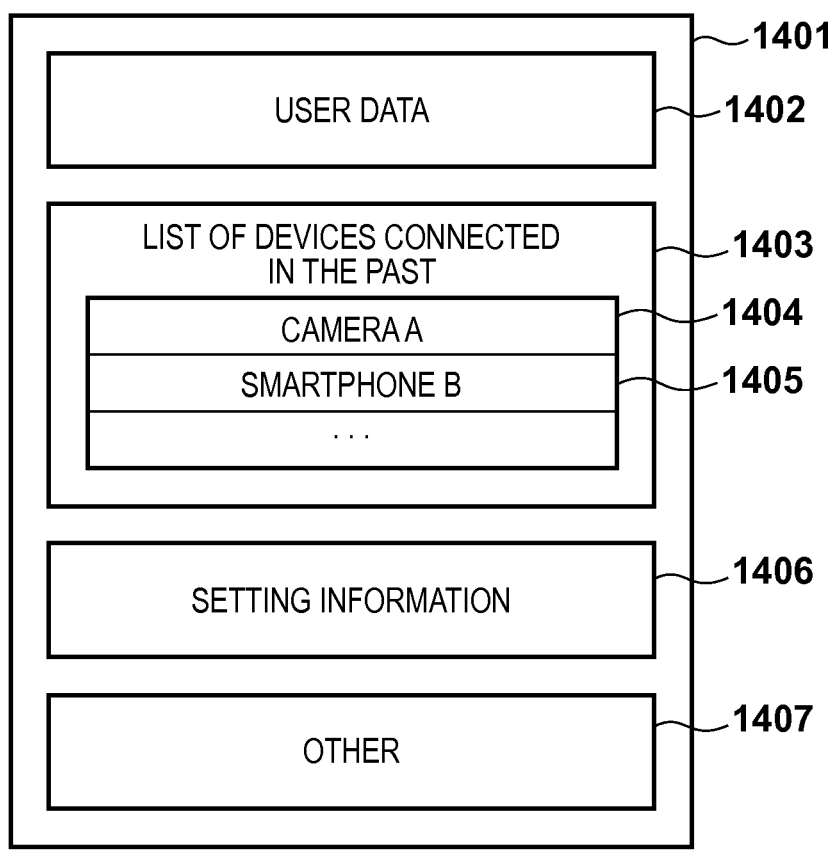

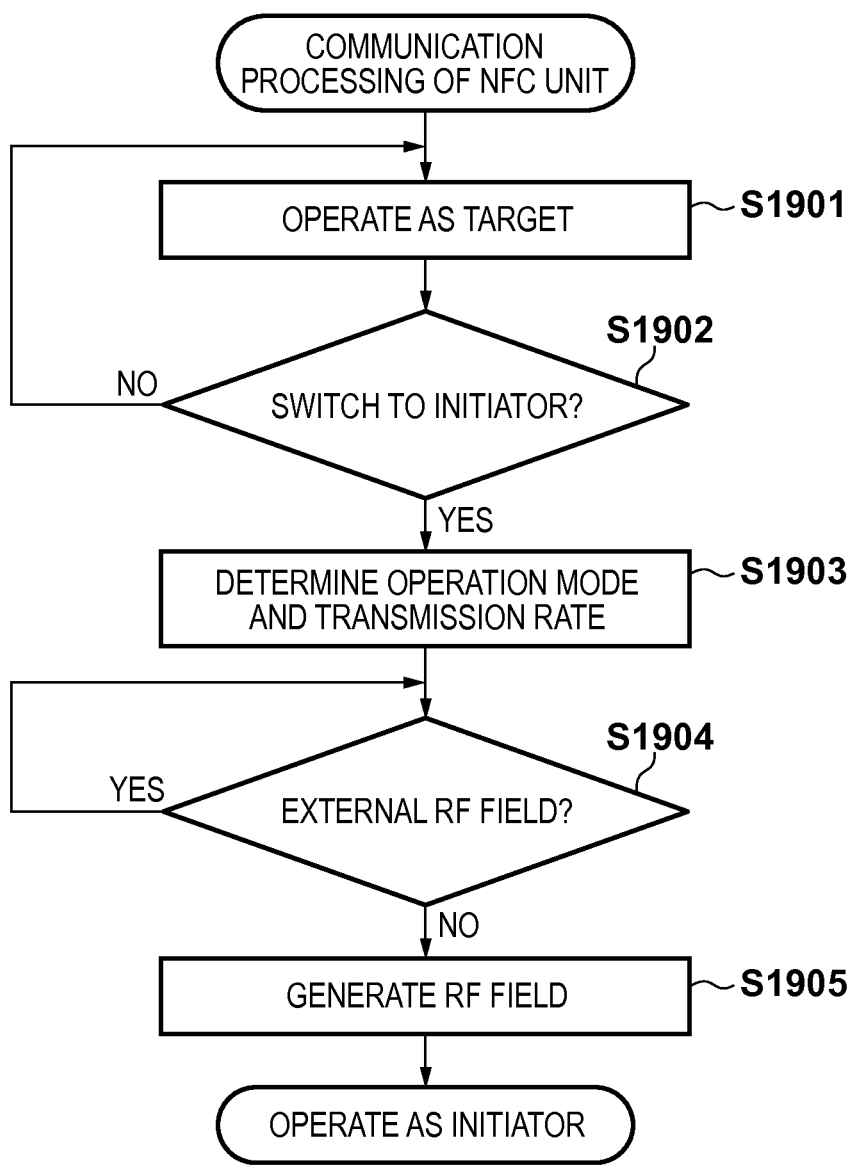
F I G. 19

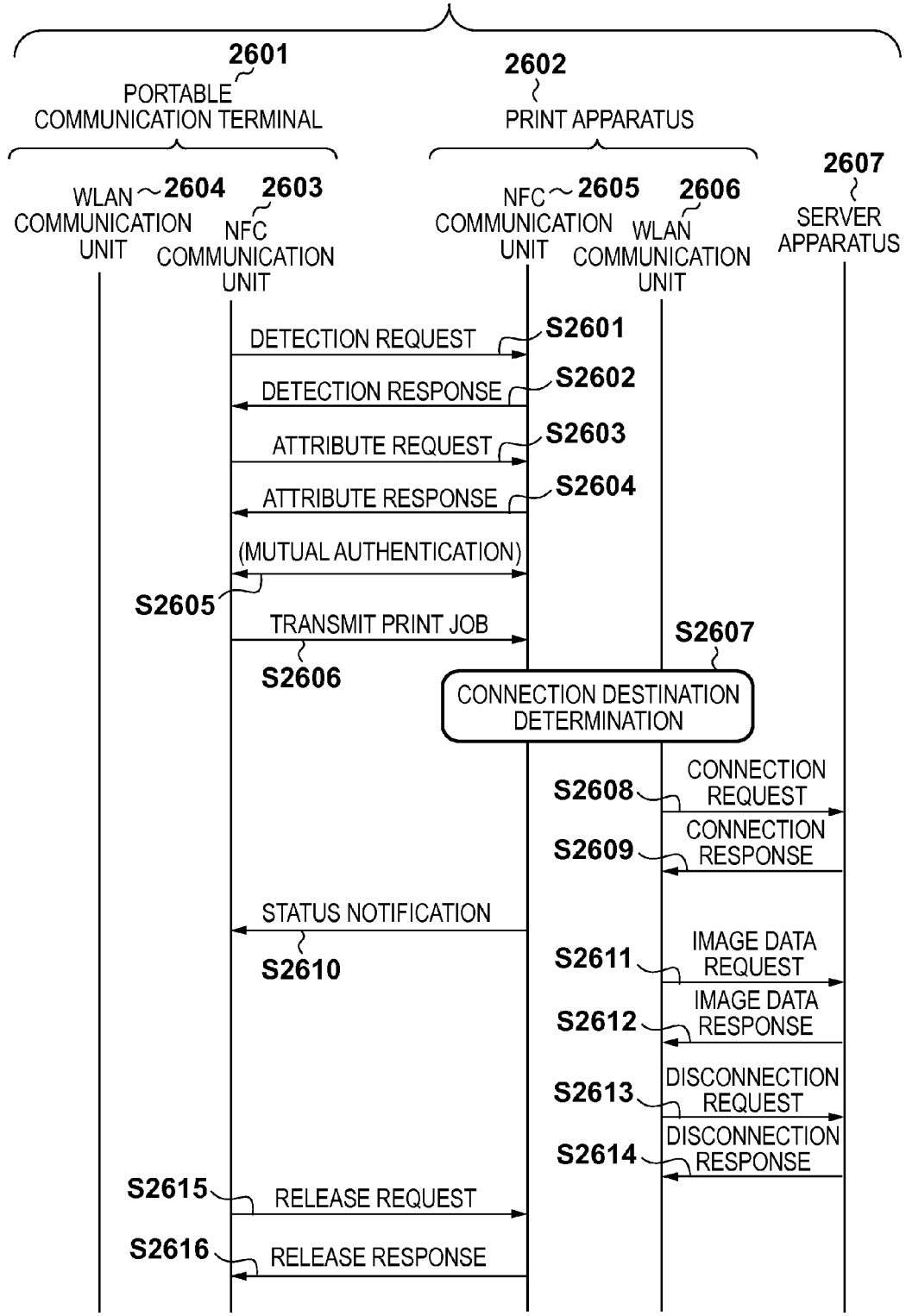

INFORMATION PROCESSING APPARATUS, CONTROL METHOD AND STORAGE MEDIUM STORING PROGRAM FOR SHORT DISTANCE WIRELESS COMMUNICATION

BACKGROUND OF THE INVENTION

1. Field of the Invention

The present invention relates to an information processing apparatus for performing short distance wireless communication, a control method, and a storage medium storing a program.

2. Description of the Related Art

A recent portable communication terminal is known to perform short distance wireless communication in addition to communication via a communication network. The communication apparatus of the partner of the short distance wireless communication is, for example, a portable communication terminal or an MFP (Multi Function Printer), and image data or the like is transmitted and received. To implement efficient communication considering the communication speed and operability, the short distance wireless communication is performed using two types of communication methods. Japanese Patent Laid-Open No. 2007-166538 describes exchanging information necessary for a second short distance wireless communication method of the target communication apparatus using a first short distance wireless communication method capable of properly specifying the communication partner, and performing high-speed communication by the second short distance wireless communication method using the information.

The first short distance wireless communication method is, for example, NFC (Near Field Communication), and the second short distance wireless communication method is, for example, Bluetooth® or wireless LAN. In Japanese Patent Laid-Open No. 2007-166538, first, the communication method and the encryption method of the next communication are transmitted using NFC. If communication can be switched, the communication is switched, and printing is performed using the second communication method.

When performing communication by the second communication method based on communication by the first communication method, as in the above-described related art, the communication by the second communication method may be performed for an apparatus different from the apparatus that has performed the first communication method. For example, assume a case in which a print is submitted to a print apparatus by NFC using a portable communication terminal, and the print apparatus obtains an image from a server apparatus and then prints it. In this case, the user of the portable communication terminal may be unable to obtain information about printing.

First, the portable communication terminal contacts the NFC unit of the print apparatus to submit the print job using NFC communication. However, if the user who has submitted the print job moves while carrying the portable communication terminal with him/her, the NFC communication is disconnected. In this case, the print apparatus executes printing but cannot communicate with the portable information terminal. For this reason, the print apparatus may be unable to notify the user of the portable information terminal of the printing progress state or printing execution result.

SUMMARY OF THE INVENTION

An aspect of the present invention is to eliminate the above-mentioned problems with the conventional technology. The present invention provides an information processing apparatus capable of appropriately notifying the user of an apparatus that has caused the information processing apparatus to execute processing of information about the processing, a control method, and a storage medium storing a program.

The present invention in its first aspect provides an information processing apparatus capable of performing communication using each of a plurality of communication methods, comprising: a reception unit configured to receive, from an external apparatus of the information processing apparatus by a first communication method among the plurality of communication methods, information used to communicate with the external apparatus by a second communication method among the plurality of communication methods; an execution unit configured to execute predetermined processing for processing target data; a determination unit configured to determine a status of the communication with the external apparatus by the first communication method; and a notification unit configured to notify, by the second communication method based on the information received by the reception unit, the external apparatus of information about execution of the predetermined processing by the execution unit in accordance with a determination result of the determination unit.

The present invention in its second aspect provides a method of controlling an information processing apparatus capable of performing communication using each of a plurality of communication methods, comprising: a reception step of receiving, from an external apparatus of the information processing apparatus by a first communication method among the plurality of communication methods, information used to communicate with the external apparatus by a second communication method among the plurality of communication methods; an execution step of executing predetermined processing for processing target data; a determination step of determining a status of the communication with the external apparatus by the first communication method; and a notification step of notifying, by the second communication method based on the information received in the reception step, the external apparatus of information about execution of the predetermined processing in the execution step in accordance with a determination result in the determination step.

The present invention in its third aspect provides a non-transitory computer-readable storage medium storing a program that causes a computer to execute: a reception step of receiving, from an external apparatus of the information processing apparatus by a first communication method among the plurality of communication methods, information used to communicate with the external apparatus by a second communication method among the plurality of communication methods; an execution step of executing predetermined processing for processing target data; a determination step of determining a status of the communication with the external apparatus by the first communication method; and a notification step of notifying, by the second communication method based on the information received in the reception step, the external apparatus of information about execution of the predetermined processing in the execution step in accordance with a determination result in the determination step.

According to the present invention, it is possible to appropriately notify the user of an apparatus that has caused the information processing apparatus to execute processing of information about the processing.

Further features of the present invention will become apparent from the following description of exemplary embodiments with reference to the attached drawings.

BRIEF DESCRIPTION OF THE DRAWINGS

FIG. 4 is a plan view showing an operation display unit;

FIG. 10 is a block diagram showing the detailed arrangement of an NFC unit;

FIG. 14 is a view showing the arrangement of the flash memory of the MFP;

FIG. 19 is a flowchart showing the procedure of causing the NFC unit to operate as an initiator;

FIG. 26 is a sequence chart showing processing when the processing of step S2305 has been selected.

DESCRIPTION OF THE EMBODIMENTS

Figure 1:
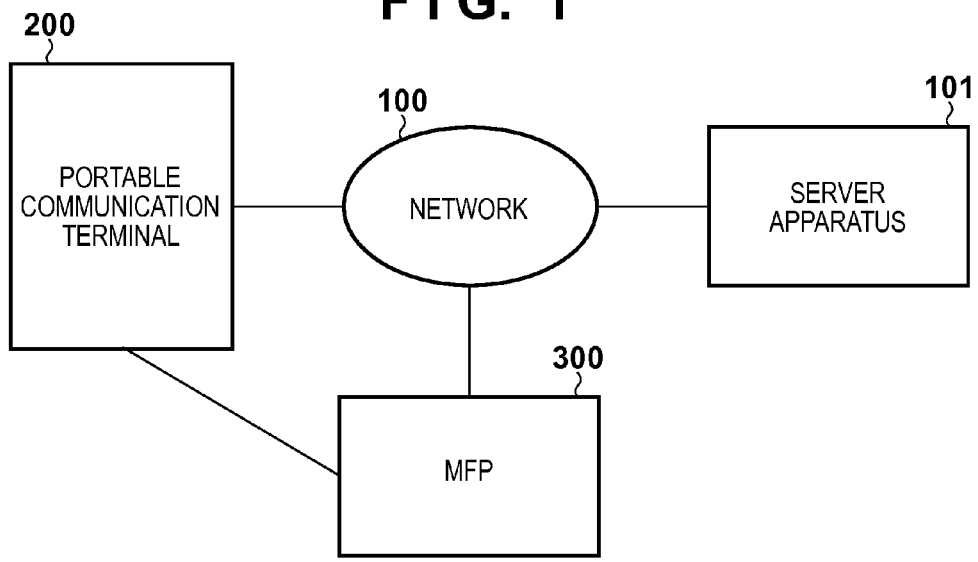
FIG. 1 is a view showing the arrangement of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

In this embodiment, an example will be described in which authentication is performed first using a short distance wireless communication method for low-speed communication, and print data is then transmitted after switching to high-speed wireless communication. More specifically, a printing method using a technique of performing authentication using a short distance wireless communication method such as NFC (Near Field Communication) and then handing over the communication to wireless communication of another communication method will be explained.

FIG. 1 is a view showing the arrangement of a wireless communication system according to this embodiment. A server apparatus 101, a portable communication terminal (portable terminal) 200, and a MFP (Multi Function Printer) 300 are connected to a network 100. The server apparatus 101 includes a storage for image data to be printed, user ID management and image processing applications, and the like. The portable communication terminal 200 has at least two types of wireless communication methods using different authentication methods and different communication speeds. The portable communication terminal 200 need only be an apparatus capable of handling files of print targets, for example, a personal information terminal such as a PDA (Personal Digital Assistant), a mobile phone, or a digital camera. The MFP 300 that is an example of an information processing apparatus has a reading function of reading a document placed on a platen glass, and a printing function using a printing unit such as an inkjet printer. The MFP 300 may also have a FAX function and a telephone function. The network 100 and the server apparatus 101 are connected by wired LAN. The network 100 and the MFP 300 are connected by wired LAN or wireless LAN (WLAN). The network 100 and the portable communication terminal 200 are connected by WLAN. The portable communication terminal 200 and the MFP 300 can perform peer to peer (P2P) communication by authenticating each other because both have the WLAN function. Note that in this embodiment, the MFP 300 will be described as a print apparatus that executes printing based on a print job.

In this embodiment, upon receiving a print job from the portable communication terminal 200 using NFC, the MFP 300 obtains the image designated by the print job from the server apparatus 101 via the network 100. At this time, the MFP 300 and the portable communication terminal 200 communicate using WLAN or Bluetooth®. This allows the MFP 300 and the portable communication terminal 200 to perform communication even if the user of the portable communication terminal 200 has moved out of the NFC communication range while carrying the portable communication terminal 200 with him/her after submitting the print job. Hence, the MFP 300 can notify the portable communication terminal 200 of the printing state and the like.

Figure 2:
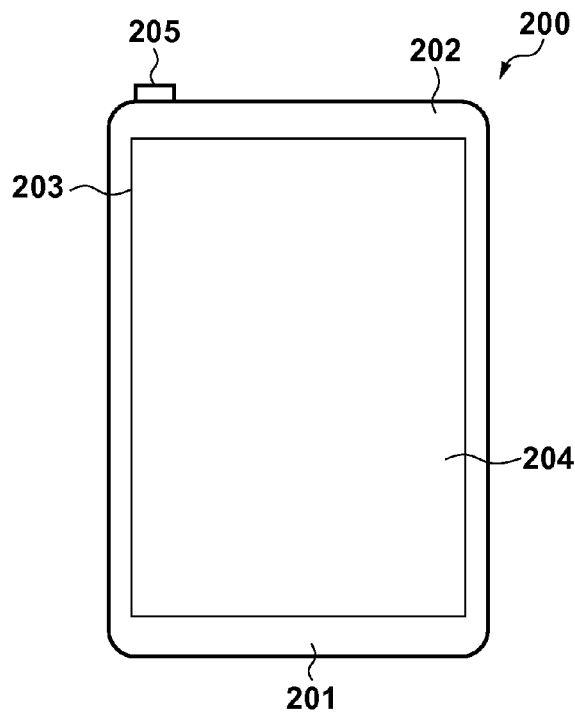
FIG. 2 is a view showing the outer appearance of a portable communication terminal.

FIG. 2 is a view showing the outer appearance of the portable communication terminal 200. In this embodiment, for example, a smartphone is used as the portable communication terminal 200. The smartphone is a multifunctional mobile phone including a camera, a network browser, a mail function, and the like as well as the functions of a mobile phone. An NFC unit 201 performs communication using NFC. Actually, communication can be performed when the user moves the NFC unit 201 close to within about 10 cm of the NFC unit of the communication partner. A WLAN unit 202 is a unit used to perform communication by WLAN and is provided in the apparatus. The communication by WLAN has a communication range wider than at least that of NFC communication. Hence, the communication apparatuses may be able to communicate by WLAN even when they are far apart by a distance more than the NFC communication range. In this embodiment, the portable communication terminal 200 communicates with the MFP 300 by NFC to transmit a print job and then performs communication by WLAN.

Hence, the communication is possible even when the portable communication terminal 200 has moved away from the MFP by a distance more than the communication range (about 10 cm) of NFC.

A display unit 203 is a display having an LCD display mechanism. An operation unit 204 includes a touch-panel operation mechanism and detects press by the user. As a representative operation method, the display unit 203 displays button-shaped images, and when the user presses the operation unit 204, an event of press on a button is issued. A power supply key 205 is used by the user to power on/off the apparatus.

Figure 3A:
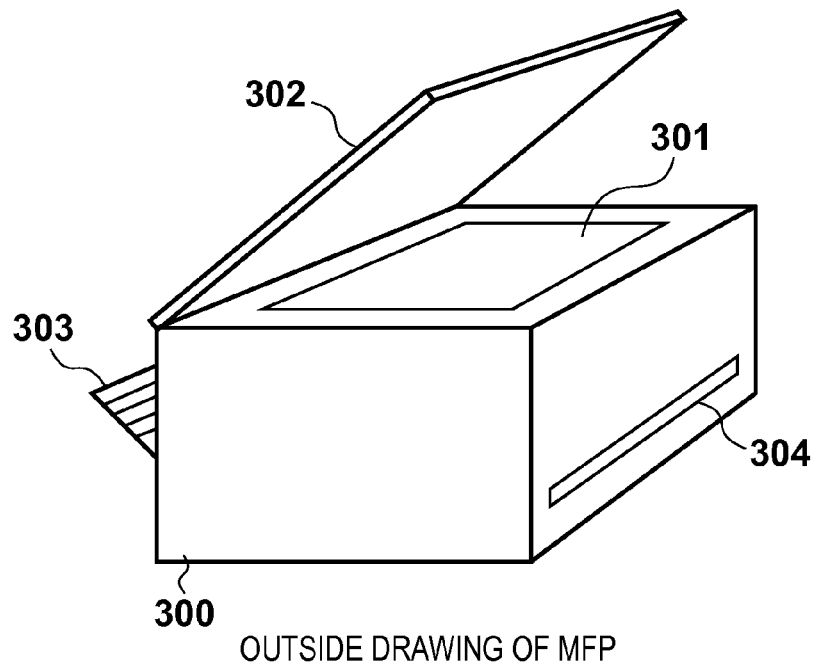
FIGS. 3A and 3B are views showing the outer appearance of an MFP.
Figure 3B:
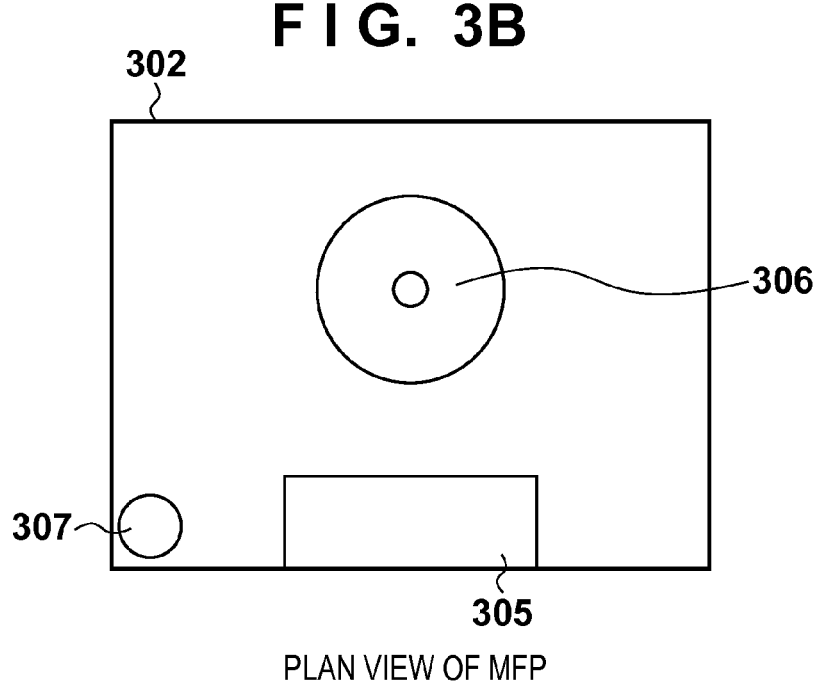

FIGS. 3A and 3B are views showing the outer appearance of the MFP. A platen glass 301 is a transparent glass table and is used to place a document to be read by a scanner. A document cover 302 is used to prevent reading light from externally leaking at the time of reading by the scanner. A printing paper insert port 303 is used to set paper sheets of various sizes. The paper sheets set in the printing paper insert port 303 are conveyed to the printing unit one by one, undergo desired printing, and are discharged from a printing paper discharge port 304. An operation display unit 305 and an NFC unit 306 are provided on the document cover 302. The operation display unit 305 will be described later with reference to FIG. 4. The NFC unit 306 is a unit used to perform short distance wireless communication and a portion where the user actually sets close to the communication partner. The effective range of contact is about 10 cm from the NFC unit 306. A WLAN antenna 307 is used to perform communication by WLAN.

FIG. 4 is a plan view of the operation display unit 305. A display unit 406 is a display screen that displays an image, an operation menu, and the like and is formed from, for example, a dot matrix LCD. A 4-way selector 401 is used to, for example, move a cursor on the display unit. A set key 402 is used to input a setting. A function key 403 is used to, for example, set a function. A start key 404 is used to execute a function of starting printing or the like.

Figure 5:
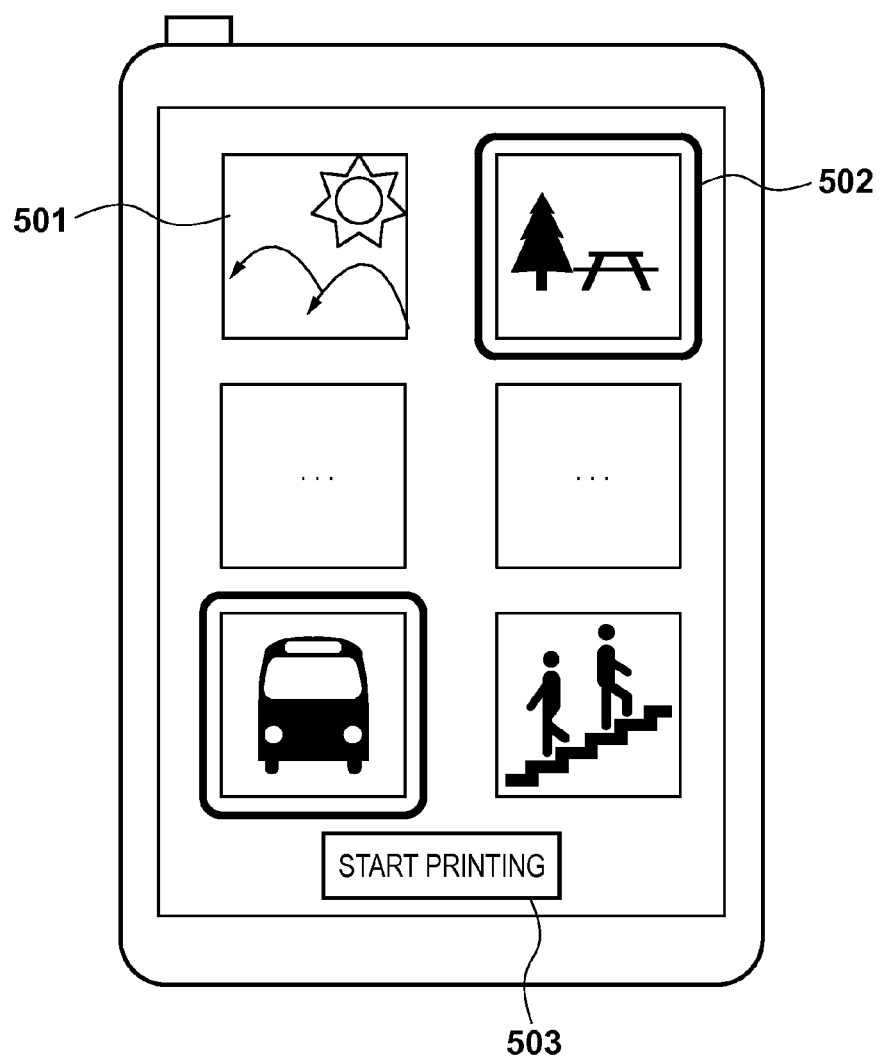
FIG. 5 is a view showing an example in which the thumbnails of printing candidates are displayed.

FIG. 5 is a view showing an example in which the thumbnails of printing candidates are displayed on the portable communication terminal 200. A thumbnail 501 is the thumbnail of each image data saved in the portable communication terminal 200 or the server apparatus 101. When the user presses an image to be printed, a focus 502 is displayed to indicate that the image is the print target. The user can select a plurality of print target images. At this time, a plurality of focuses 502 exist on the display unit 203. If not all the thumbnails can be displayed in one screen, scroll display may be performed. Upon completing selection of the image to be printed, the user presses a print start key 503 to transmit the print job to the print apparatus.

NFC communication will be explained next. When short distance communication using the NFC unit is performed, an apparatus that starts the short distance wireless communication first by sending an RF field (Radio Frequency field) is called an initiator. An apparatus that communicates with the initiator by responding to a command issued by the initiator is called a target. The NFC unit has a passive mode and an active mode as the communication modes. In the passive mode, the target responds to the command of the initiator by performing load modulation of the RF field sent from the initiator. On the other hand, in the active mode, the target can respond to the command of the initiator by sending an RF field by itself.

Note that the passive mode or active mode is decided by the apparatus that performs the NFC communication, and the apparatus sends an RF field to indicate the decided mode. The apparatus that has decided the mode is the initiator.

Figure 6A:
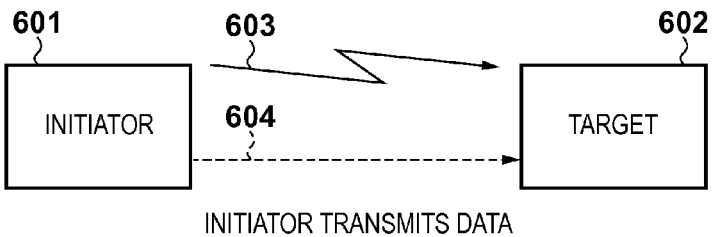
FIGS. 6A and 6B are views showing the concept of a passive mode in NFC communication.
Figure 6B:
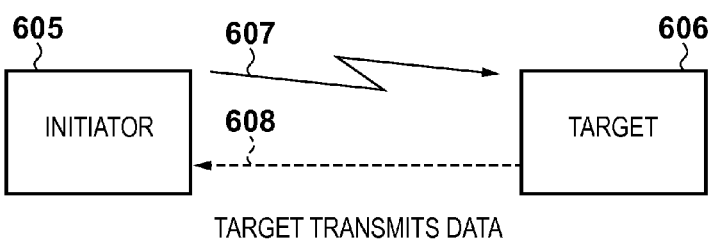

FIGS. 6A and 6B are views showing the concept of the passive mode in NFC communication. As shown in FIG. 6A, when an initiator 601 is to transmit data 604 to a target 602 in the passive mode, the initiator 601 generates an RF field 603. The initiator 601 modulates the RF field 603 by itself, thereby transmitting the data 604 to the target 602. As shown in FIG. 6B, when a target 606 is to transfer data 608 to an initiator 605 in the passive mode, the initiator 605 generates an RF field 607, as in FIG. 6A. The target 606 performs load modulation of the RF field 607, thereby transmitting the data 608 to the initiator 605.

Figure 7A:
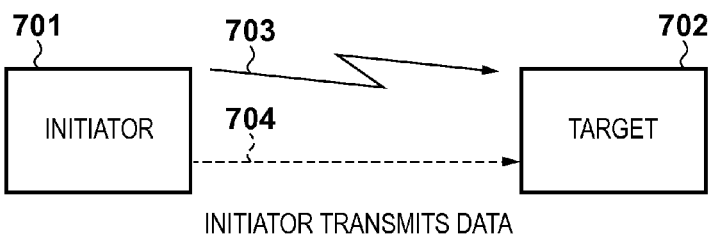
FIGS. 7A and 7B are views showing the concept of an active mode in NFC communication.
Figure 7B:
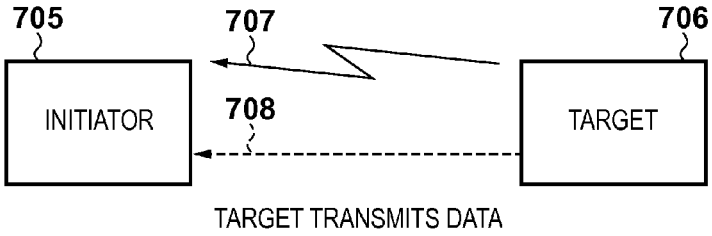

FIGS. 7A and 7B are views showing the concept of the active mode in NFC communication. As shown in FIG. 7A, when an initiator 701 is to transmit data 704 to a target 702 in the active mode, the initiator 701 generates an RF field 703. The initiator 701 modulates the RF field 703 by itself, thereby transmitting the data 704 to the target 702. When data transmission is completed, the initiator 701 stops outputting the RF field 703. As shown in FIG. 7B, when a target 706 is to transmit data 708 to an initiator 705 in the active mode, the target 706 generates an RF field 707. The target 706 transmits the data 708 by the RF field 707 generated by itself and stops outputting the RF field 707 upon completing transmission.

Figure 8:
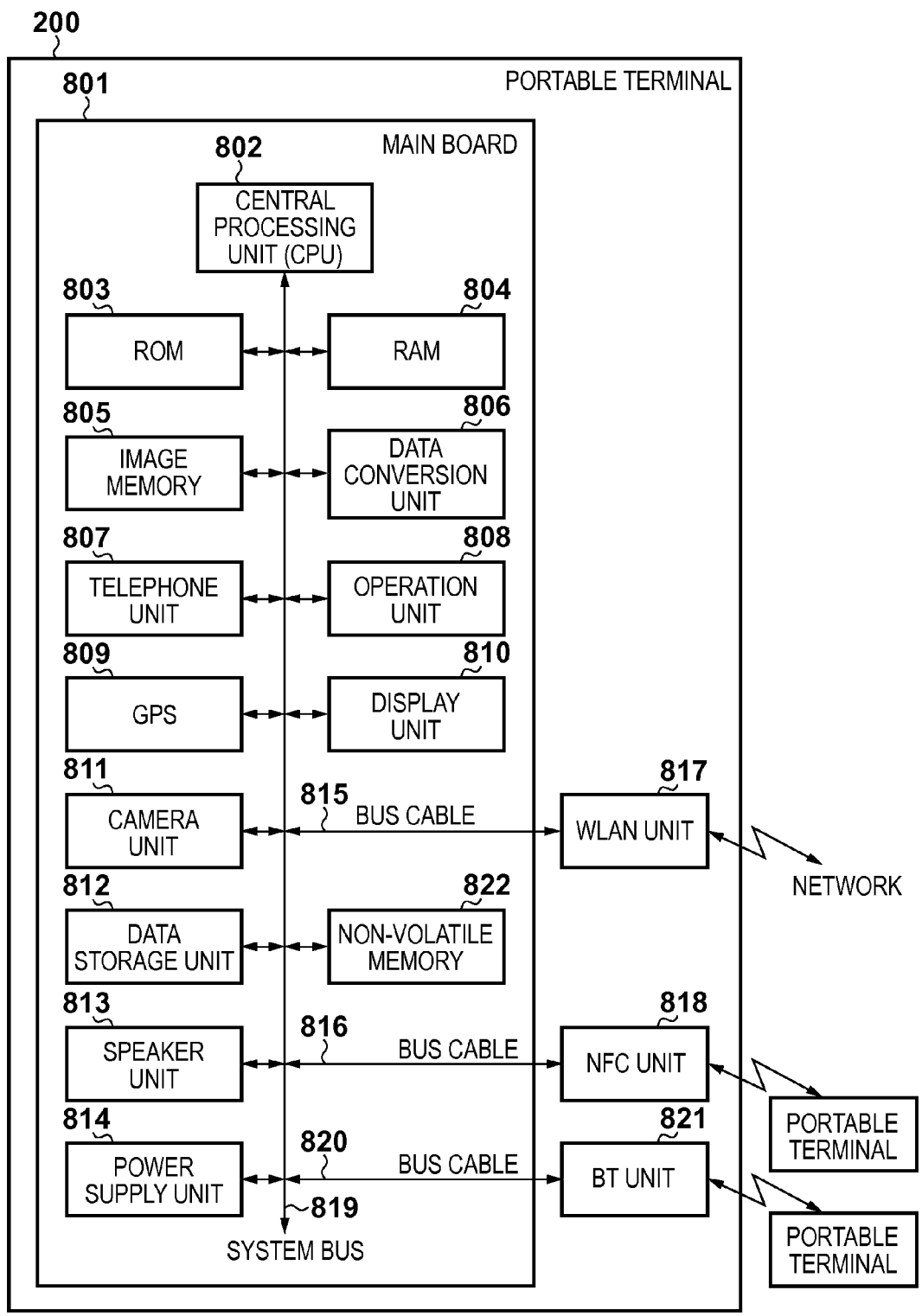
FIG. 8 is a block diagram showing the arrangement of the portable communication terminal.

FIG. 8 is a block diagram of the portable communication terminal 200. The portable communication terminal 200 includes a main board 801 that performs main control of the apparatus, a WLAN unit 817 that performs WLAN communication, an NFC unit 818 that performs NFC communication, and a BT unit 821 that performs Bluetooth® communication.

A CPU 802 of the main board 801 is a system control unit and controls the entire portable communication terminal 200. A ROM 803 stores control programs, an embedded operating system (OS) program, and the like to be executed by the CPU 802. In this embodiment, each control program stored in the ROM 803 performs software control such as scheduling and task switching under the management of the embedded OS stored in the ROM 803.

A RAM 804 is formed from an SRAM (static RAM) or the like. The RAM 804 stores program control variables, set values registered by the user, management data of the portable communication terminal 200, and the like, and also includes various kinds of work buffer areas. An image memory 805 is formed from a DRAM (dynamic RAM) or the like. The image memory 805 temporarily stores image data received via each communication unit or image data read out from a data storage unit 812 for processing by the CPU 802. A non-volatile memory 822 is formed from a flash memory or the like and stores data to be saved even after power-off. Example of the data are telephone directory data and information of devices connected in the past. Note that the memory structure is not limited to this. For example, the image memory 805 and the RAM 804 may share a memory, or data may be backed up in the data storage unit 812. In this embodiment, a DRAM is used. However, a hard disk, a non-volatile memory, or the like may be used.

A data conversion unit 806 performs analysis of a data description language (PDL) or data conversion such as color conversion and image conversion. A telephone unit 807 controls a telephone line and processes voice data input/output via a speaker unit 813 to implement communication by telephone. An operation unit 808 controls the signal of the operation unit 204 described with reference to FIG. 2. A GPS (Global Positioning System) 809 obtains the current latitude and longitude. A display unit 810 electronically controls the display contents of the display unit 203 described with reference to FIG. 2 and can display various kind of input operations, the operation state and status of the MFP 300, and the like. A camera unit 811 has a function of electronically recording and coding an image input via a lens. The image captured by the camera unit 811 is saved in a data storage unit 812. The speaker unit 813 implements a function of inputting or outputting a voice for the telephone function, an alarm notification function, and the like. A power supply unit 814 is, for example, a portable battery and controls the power supply. Power supply states include a battery dead state corresponding to a zero battery level, a power off state before the user presses the power supply key 205, an active state in which the apparatus is normally activated, and a power saving state in which the apparatus is activated, but the power is saved.

The portable communication terminal 200 includes three components used for wireless communication. The portable communication terminal 200 can perform wireless communication by WLAN, NFC, and Bluetooth®. The WLAN unit 817, the NFC unit 818, and the BT unit 821 are communication units that perform data communication with another apparatus such as an MFP. Each of the units 817, 818, and 821 converts data into packets and transmits the packets to another apparatus. Reversely, each unit converts packets from another external apparatus into data and transmits the data to the CPU 802. The WLAN unit 817, the NFC unit 818, and the BT unit 821 are connected to a system bus 819 by bus cables 815, 816, and 820, respectively. The WLAN unit 817, the NFC unit 818, and the BT unit 821 are units configured to implement communication complying with the standards. Details of the NFC unit 818 will be described later with reference to FIG. 10.

The above-described units 803 to 814, 817, 818, 821, and 822 are connected to each other via the system bus 819 managed by the CPU 802.

Figure 9:
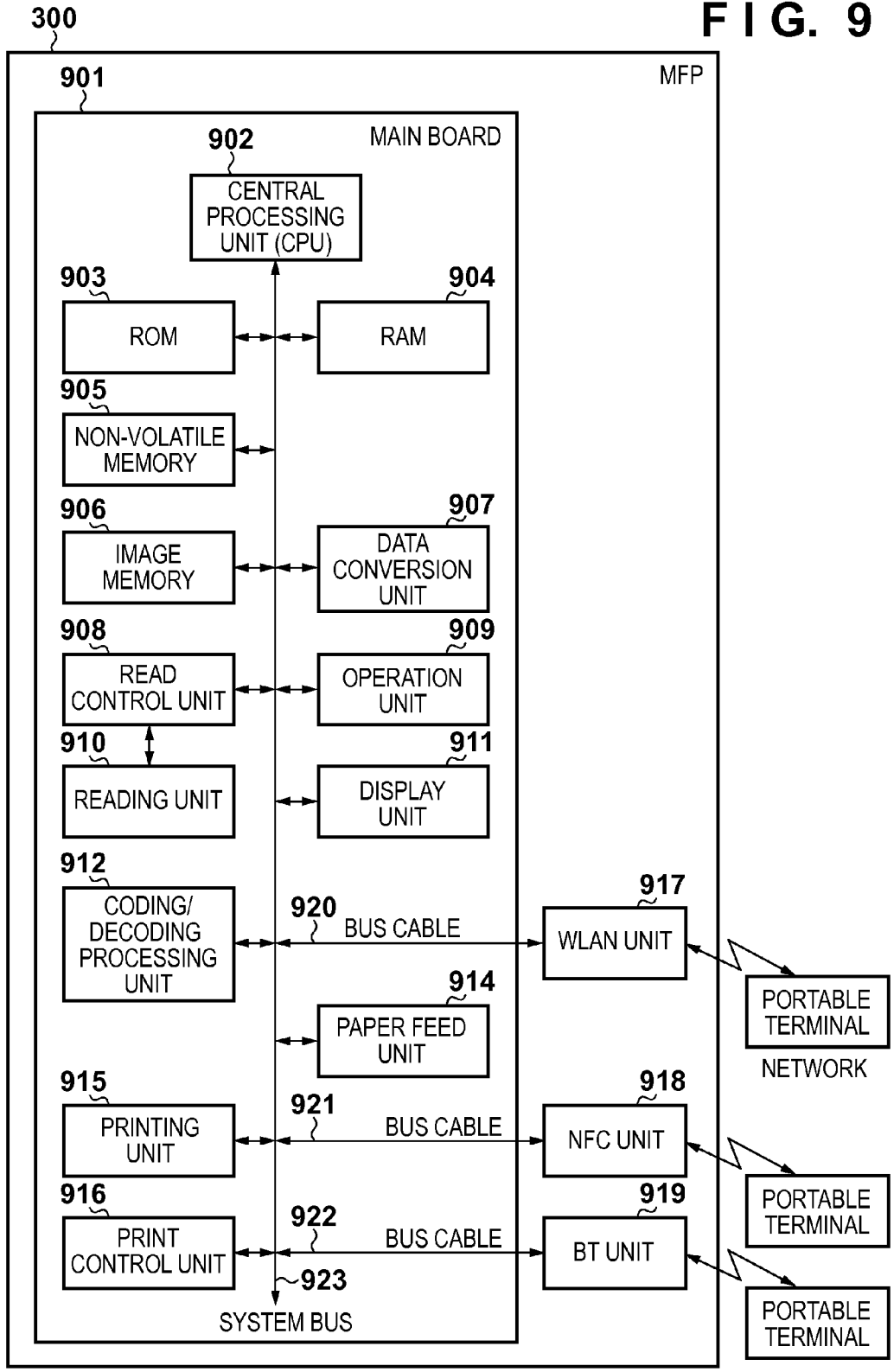
FIG. 9 is a block diagram showing the arrangement of the MFP.

FIG. 9 is a block diagram showing the schematic arrangement of the MFP 300. The MFP 300 includes a main board 901 that performs main control of the apparatus, a WLAN unit 917 that performs WLAN communication, an NFC unit 918 that performs NFC communication, and a BT unit 919 that performs Bluetooth® communication.

A CPU 902 of the main board 901 is a system control unit and controls the entire MFP 300. A ROM 903 stores control programs, an embedded operating system (OS) program, and the like to be executed by the CPU 902. In this embodiment, each control program stored in the ROM 903 performs software control such as scheduling and task switching under the management of the embedded OS stored in the ROM 903.

A RAM 904 is formed from an SRAM (static RAM) or the like. The RAM 904 stores program control variables, set values registered by the user, management data of the MFP 300, and the like, and also includes various kinds of work buffer areas. A non-volatile memory 905 is formed from a flash memory or the like and stores data to be held even after power-off. Examples of the data are network connection information and user data. An image memory 906 is formed from a DRAM (dynamic RAM) or the like. The image memory 906 stores image data received via each communication unit, image data processed by a coding/decoding processing unit 912, image data obtained via a memory card controller 516, and the like. Like the memory structure of the portable communication terminal 200, the memory structure is not limited to the above-described structure. A data conversion unit 907 performs analysis of a data description language (PDL) or conversion of image data into print data.

A read control unit 908 will be described. A reading unit 910 optically reads a document by a CIS image sensor (contact type image sensor). Next, the reading unit 910 performs, for the image signal converted into electrical image data, various kinds of image processing such as binarization processing and halftone processing via an image processing control unit (not shown) and outputs high-resolution image data.

An operation unit 909 and a display unit 911 include the operation display unit 305 as described with reference to FIG. 4. The coding/decoding processing unit 912 performs coding/decoding processing or enlargement/reduction processing for the image data (JPEG, PNG, or the like) handled by the MFP 300. A paper feed unit 914 holds printing paper sheets. The paper feed unit 914 can feed paper under the control of a print control unit 916. Especially, the paper feed unit 914 may include a plurality of paper feed units to hold a plurality of kinds of printing paper sheets in one apparatus. The print control unit 916 controls from which the paper feed unit feeds paper.

The print control unit 916 converts the image data to be printed into high-resolution image data by performing various kinds of image processing such as smoothing processing, printing density correction processing, and color correction via the image processing control unit (not shown) and outputs the image data to a printing unit 915. The print control unit 916 also has a function of periodically reading out the information of the printing unit and updating the information in the RAM 904. The information of the printing unit includes, for example, the ink amount remaining in the ink tank and the state of the printhead. The MFP 300 also includes three components used for wireless communication with the portable communication terminal 200, as described above. The units 903 to 919 are communicably connected to each other via a system bus 923 managed by the CPU 902.

FIG. 10 is a block diagram showing the detailed arrangement of an NFC unit 1000 used as the NFC unit 818 or the NFC unit 918. The NFC unit 1000 includes an NFC controller unit 1001, an antenna unit 1002, an RF unit 1003, a transmission/reception control unit 1004, an NFC memory 1005, a power supply 1006, and a device connection unit 1007. The antenna unit 1002 receives a radio wave or a carrier from another NFC device or transmits a radio wave or a carrier to another NFC device. The RF unit 1003 has a function of modulating/demodulating an analog signal into a digital signal. The RF unit 1003 includes a synthesizer, identifies the frequency of a band or a channel, and controls the band or channel by frequency assignment data. The transmission/reception control unit 1004 performs control concerning transmission/reception, including frame segmentation and reassembly, preamble addition and detection, and frame identification. The transmission/reception control unit 1004 also controls the NFC memory 1005 and reads/writes various kinds of data and programs.

When the NFC unit 1000 operates in the active mode, it receives power via the power supply 1006. The NFC unit 1000 communicates with a device via the device connection unit 1007 or communicates with another NFC device within a communication range by generating an electromotive force in the device by electromagnetic induction using a carrier transmitted/received via the antenna unit 1002. On the other hand, when the NFC unit 1000 operates in the passive mode, it receives a carrier from another NFC device via the antenna and receives power from the other NFC device on the communication partner side by electromagnetic induction. The NFC unit 1000 then communicates with the other NFC device by modulating the carrier, thereby transmitting/receiving a carrier.

Figure 11A:
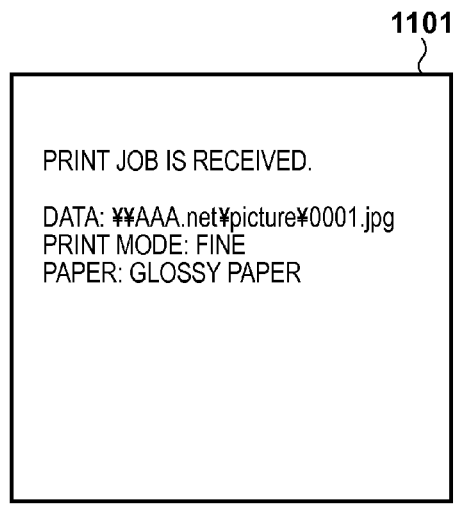
FIGS. 11A and 11B are views showing display examples of the display unit of the MFP.
Figure 11B:
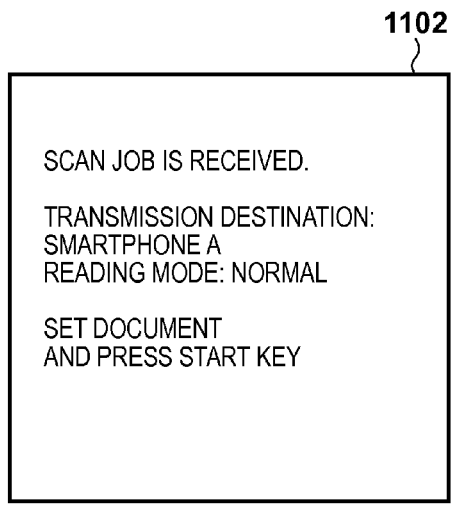

FIGS. 11A and 11B are views showing display examples of the display unit 406 of the MFP 300. Upon receiving a print job from the portable communication terminal 200, the display unit 406 displays a print job conformation screen 1101.

Upon receiving a reading job, the display unit 406 displays a reading job conformation screen 1102.

Figure 12A:
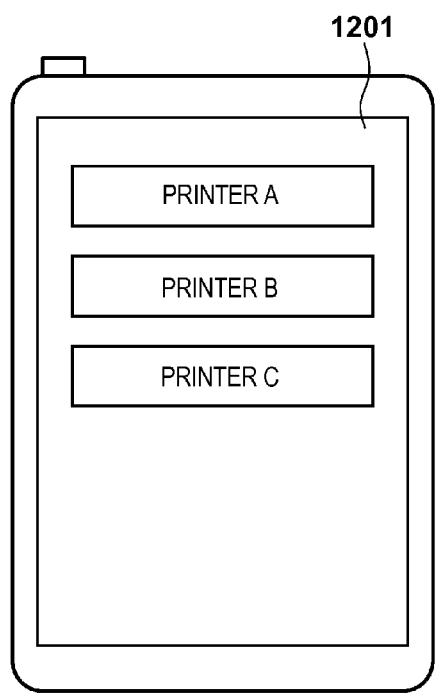
FIGS. 12A and 12B are views showing display examples of the display unit of the portable communication terminal.
Figure 12B:
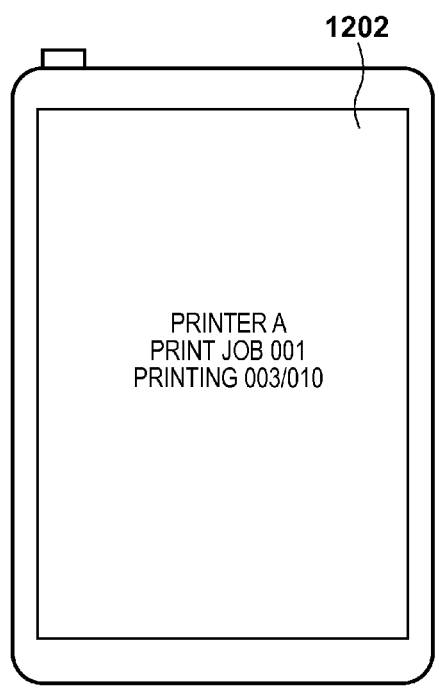

FIGS. 12A and 12B are views showing display examples of the display unit 203 of the portable communication terminal 200. A printer selection screen 1201 is an example of a screen used to select a printer to print. A printing state display screen 1202 is an example in which the current state of the print apparatus to which a print job has been submitted is displayed in real time.

Figure 13:
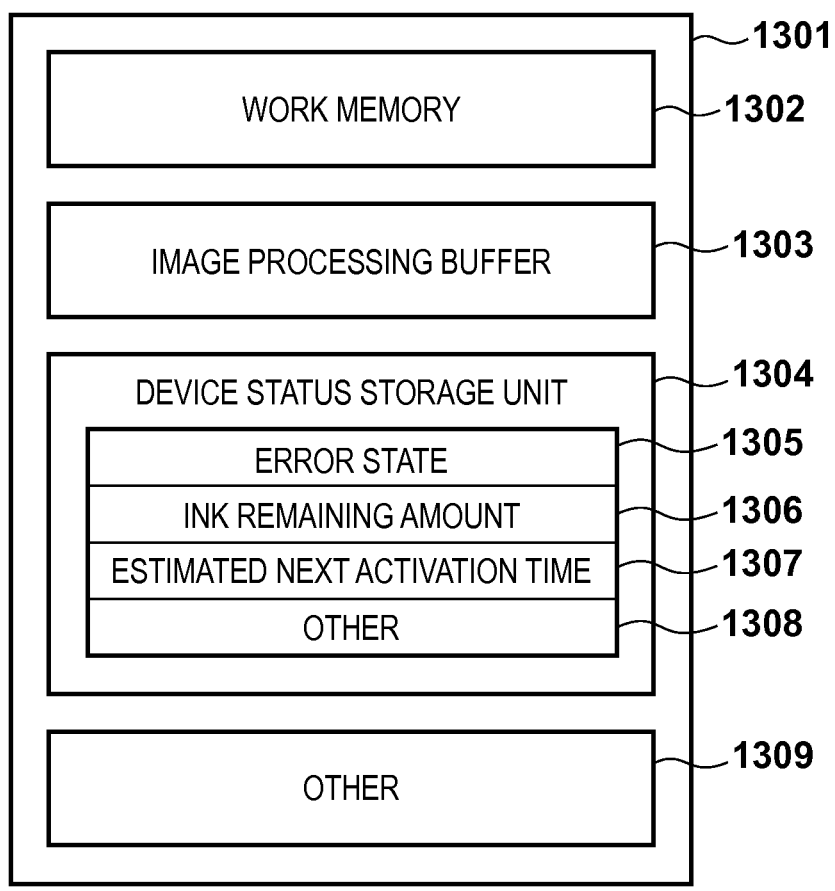
FIG. 13 is a view showing the arrangement of the RAM of the MFP.

FIG. 13 is a view showing the arrangement of the RAM 904 of the MFP. Reference numeral 1301 denotes an entire RAM. A work memory 1302 is a memory allocated to execute a program. An image processing buffer 1303 is an area used as a temporary buffer for image processing. A device status storage unit 1304 stores various kinds of information about the current state of the MFP 300. An error state 1305 stores a state about an error of the MFP 300. Examples of the state about an error are a low-ink warning, an ink-out error, a paper jam error, a paper-out warning, an image printing failure warning, an image reading failure warning, and a network disconnection warning. The level of influence on the printing function, the level of influence on the reading function, and the like are associated with these warnings and errors. For example, in case of the ink-out error, the printing function is unusable, but the reading function is usable. In case of the network disconnection warning, any function using the network is unusable, but a setting change in the device alone or the reading function is usable. An ink remaining amount 1306 stores the model number of the currently attached ink tank and the ink remaining amount. The model number of the ink tank is updated at the timing of attaching the ink tank. The ink remaining amount is updated every time the ink is used. An estimated next activation time 1307 stores the estimated time of next activation at the time of power-off. The activation time of the MFP largely changes depending not the state. The power supply states of the MFP include, for example, a hard-off state, a soft-off state, a normal activation state, and a sleep state.

The hard-off state is a state in which the power supply has stopped. To cause transition from the hard-off state to the normal activation state by power-on, a long time is required. The soft-off state is a state in which the power supply is partially supplied, though the main program is not activated. In this case, the MFP can be activated in a shorter time than hard-off. In the sleep state, only parts that consume large power are off, and other programs and mechanisms are operating. Hence, the normal activation state can be restored relatively quickly. Another factor that causes a variation in the activation time is an error state of the device. For example, upon detecting that many of the nozzles of the printhead of inkjet printing are clogged, the MFP is activated next time after long-time recovery processing. If the light power of the scanner has dropped, the MFP is activated after an adjustment operation. In this way, the estimated activation time of the next activation is decided based on the power supply state transition and the device status. Other 1308 stores other device statuses such as the current memory utilization, hardware temperature, and consumable information. Other 1309 stores other RAM data.

FIG. 14 is a view showing the arrangement of the flash memory 905 of the MFP 300. Reference numeral 1401 denotes an entire flash memory. User data 1402 stores information about the user, for example, a FAX number, communication history, network information, and the like. A list 1403 of devices connected in the past stores a list of devices connected to the MFP 300 so far. For example, if the MFP communicated with a smartphone by NFC, the identifier of the smartphone is stored as a list 1405. If the MFP communicated with a camera by NFC, the identifier of the camera is stored as a list 1404.

If P2P communication with a smartphone was done by WLAN, identification information used for WLAN communication is stored. For example, if WPS (Wi-Fi Protected Setup) is used for WLAN communication, WPS Credential authentication information is stored. If the MFP was connected to a smartphone by Bluetooth, OOB authentication information is stored. If the MFP was connected to a server apparatus via a LAN, the network information of the server apparatus is stored. Setting information 1406 stores the setting information of the MFP apparatus. For example, a menu item such as a print mode or correction information of a printhead of inkjet printing is stored. Other 1407 stores another non-volatile information.

Figure 15:
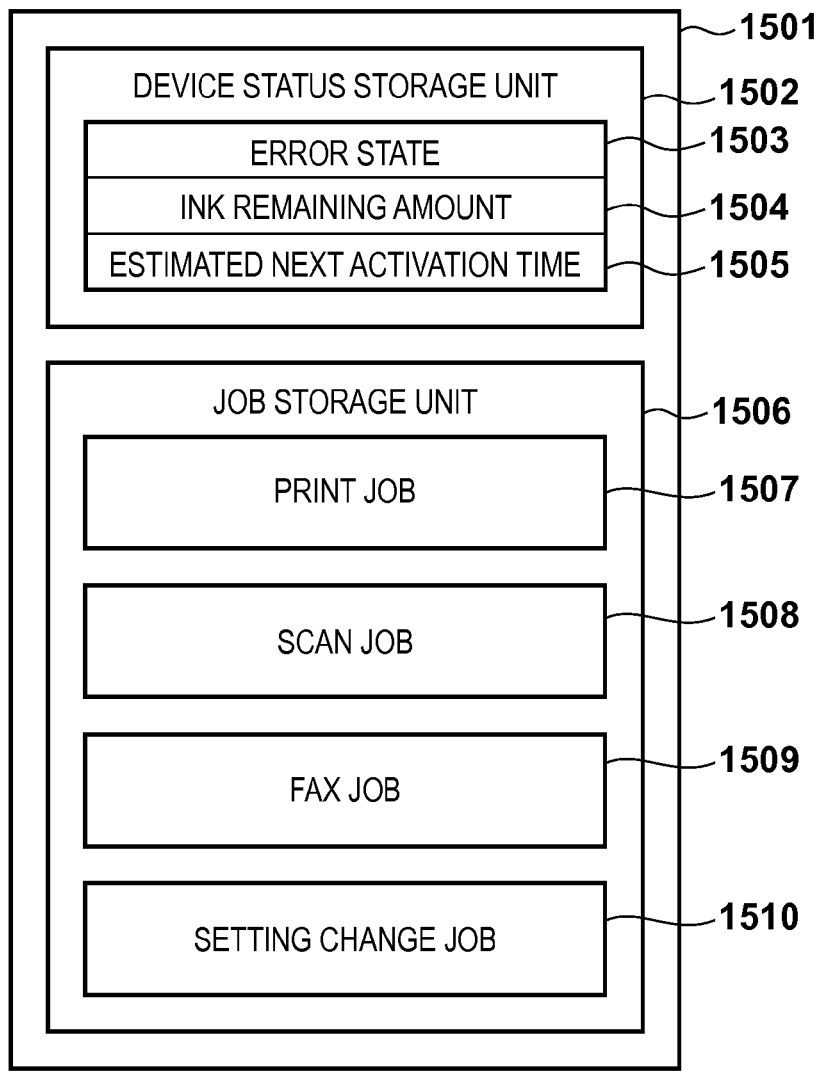
FIG. 15 is a view showing the arrangement of the NFC memory of the MFP.

FIG. 15 is a view showing the arrangement of the NFC memory 1005 of the MFP 300. Reference numeral 1501 denotes an entire NFC memory. The contents of the device status storage unit 1304 are copied to a device status storage unit 1502 at a predetermined timing. Hence, an error state 1503, an ink remaining amount 1504, and an estimated next activation time 1505 correspond to the error state 1305, the ink remaining amount 1306, and the estimated next activation time 1307, respectively. A job storage unit 1506 is an area used to submit various kinds of jobs from the portable communication terminal 200 to the MFP 300 by NFC. A print job 1507 stores print jobs in queue. For example, print settings and an image link destination are stored. A scan job 1508 stores scan jobs in queue. For example, reading settings are stored. A FAX job 1509 stores FAX jobs in queue. For example, FAX settings including the telephone number of a transmission destination and communication quality, and if an image has already been read, the link destination of the image are stored. A setting change job 1510 stores setting change jobs in queue. For example, jobs concerning changes in the setting items of the main body are stored.

Figure 16:
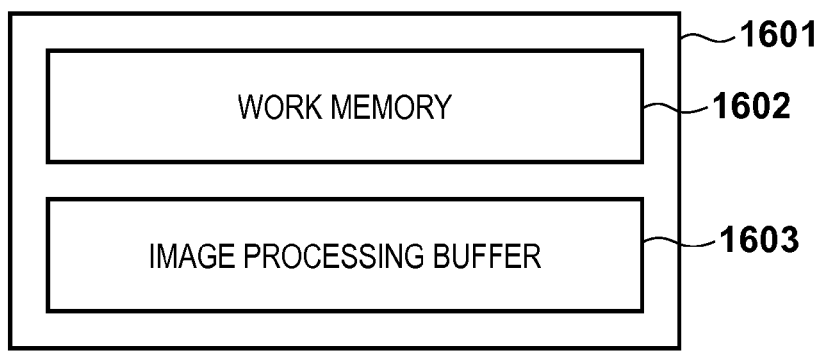
FIG. 16 is a view showing the arrangement of the RAM of the portable communication terminal.

FIG. 16 is a view showing the arrangement of the RAM of the portable communication terminal 200. Reference numeral 1601 denotes an entire RAM. A work memory 1602 is a memory allocated to execute a program. An image processing buffer 1603 is a buffer used to reduce an image to a thumbnail size or send an image to a printer by band processing.

Figure 17:
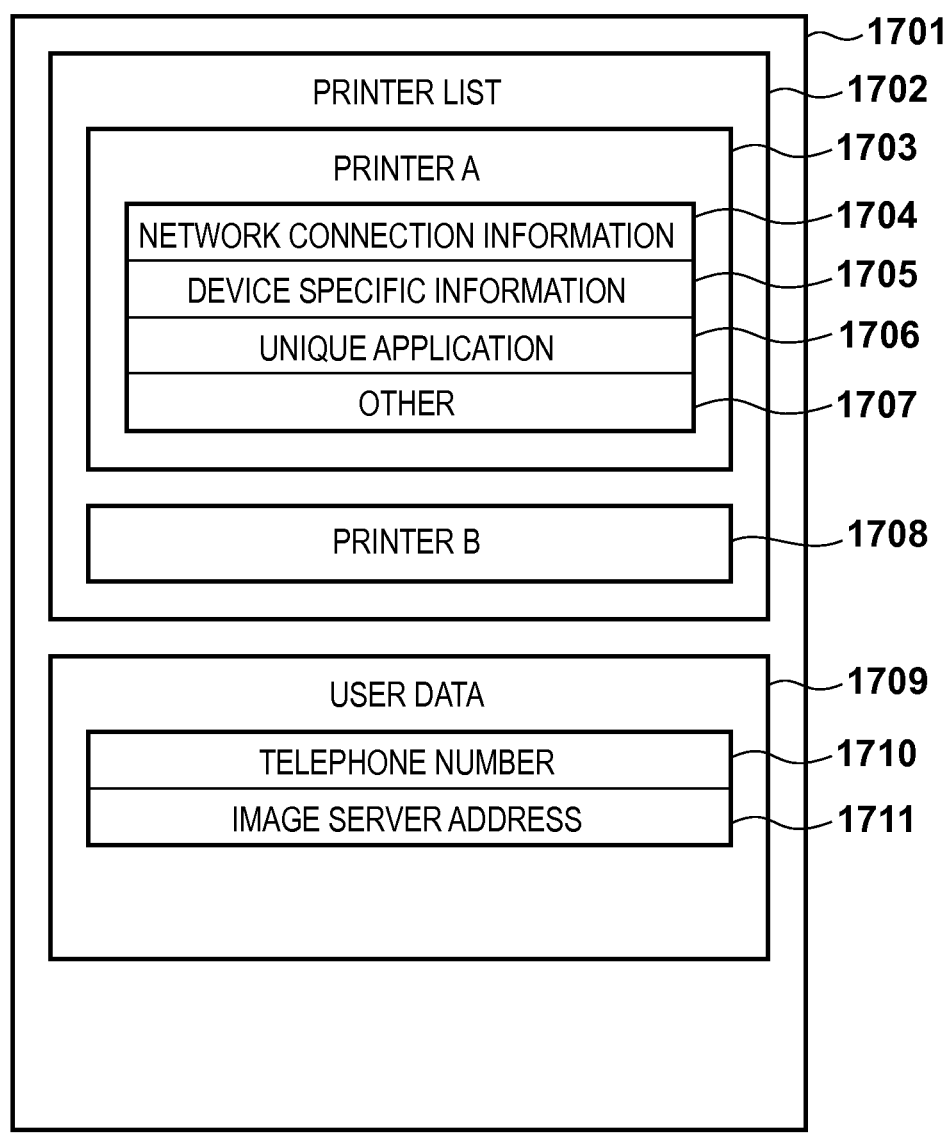
FIG. 17 is a view showing the arrangement of the non-volatile memory of the portable communication terminal.

FIG. 17 is a view showing the arrangement of the non-volatile memory 822 of the portable communication terminal 200. Reference numeral 1701 denotes an entire non-volatile memory. A printer list 1702 stores a list of printers connected to the portable communication terminal 200 so far. A printer A 1703 is an example of the printer. Network connection information 1704 stores network connection information obtained when the printer A was connected to a network. For example, when the printer is connected via a LAN, the address of the connection destination and authentication information are stored. Device specific information 1705 stores information about the printer, for example, information such as the resolution and the number of inks of the printer. A unique application 1706 stores an application used to perform processing unique to the printer, which is downloaded via a network or saved in the portable communication terminal 200 when it was connected to the printer for the first time. The unique application converts an image into a format complying with the specifications of the printer, controls band processing, or controls communication. Other 1707 stores other information about the printer A. A printer B 1708 is an example of another printer. User data 1709 stores a telephone number 1710 and an image server address 1711 as data about the user.

Figure 18:
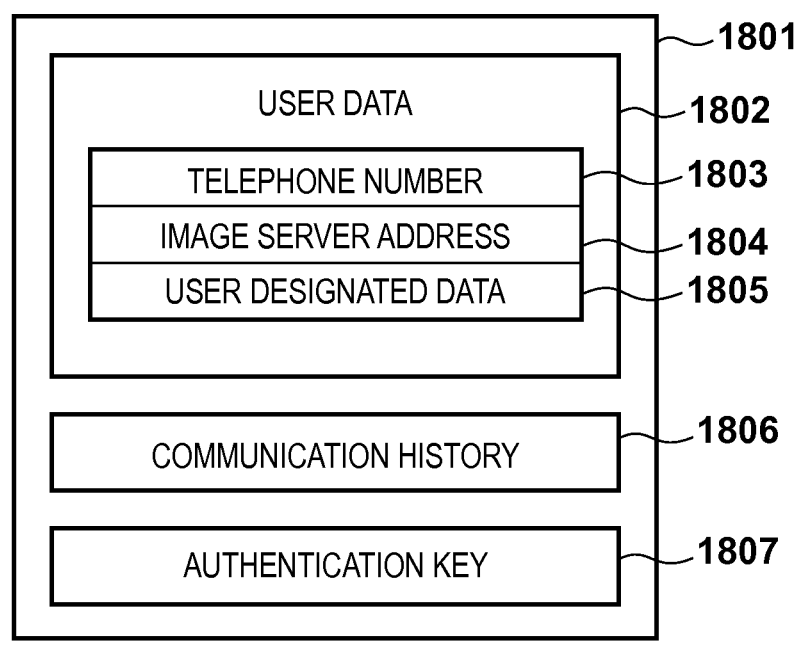
FIG. 18 is a view showing the arrangement of the NFC memory of the portable communication terminal.

FIG. 18 is a view showing the arrangement of the NFC memory 1005 of the portable communication terminal 200. Reference numeral 1801 denotes an entire NFC memory. User data 1802 stores a telephone number 1803 and an image server address 1804. User designated data 1805 can also additionally be stored in accordance with a user designation. The NFC memory 1801 also stores a communication history 1806 and the like. If the portable communication terminal 200 communicates with a target in the passive mode, data write/read of the NFC memory 1005 can be performed by executing authentication using an authentication key 1807 in accordance with a predetermined procedure even after the battery of the portable communication terminal 200 is dead.

FIG. 19 is a flowchart showing the procedure of causing an NFC unit to operate as an initiator (initiator mode). Each process shown in FIG. 19 is executed by the CPU and the like of the apparatus incorporating the NFC unit. First, in step S1901, every NFC unit operates as a target and waits for a command from an initiator. In step S1902, the NFC unit can switch to an initiator in response to a request from an application that controls communication complying with the NFC standards. If the NFC unit has responded to the request to switch to the initiator, the application selects one of the active mode and the passive mode and decides the transmission rate in step S1903. In step S1904, the initiator detects the existence of an RF field output from an apparatus other than itself. Upon detecting the existence of an external RF field, the initiator does not generate the RF field of its own. If the existence of an external RF field is not detected, the process advances to step S1905, and the initiator generates the RF field of its own. With the above-described processes, the NFC unit starts the operation as the initiator.

Figure 20:
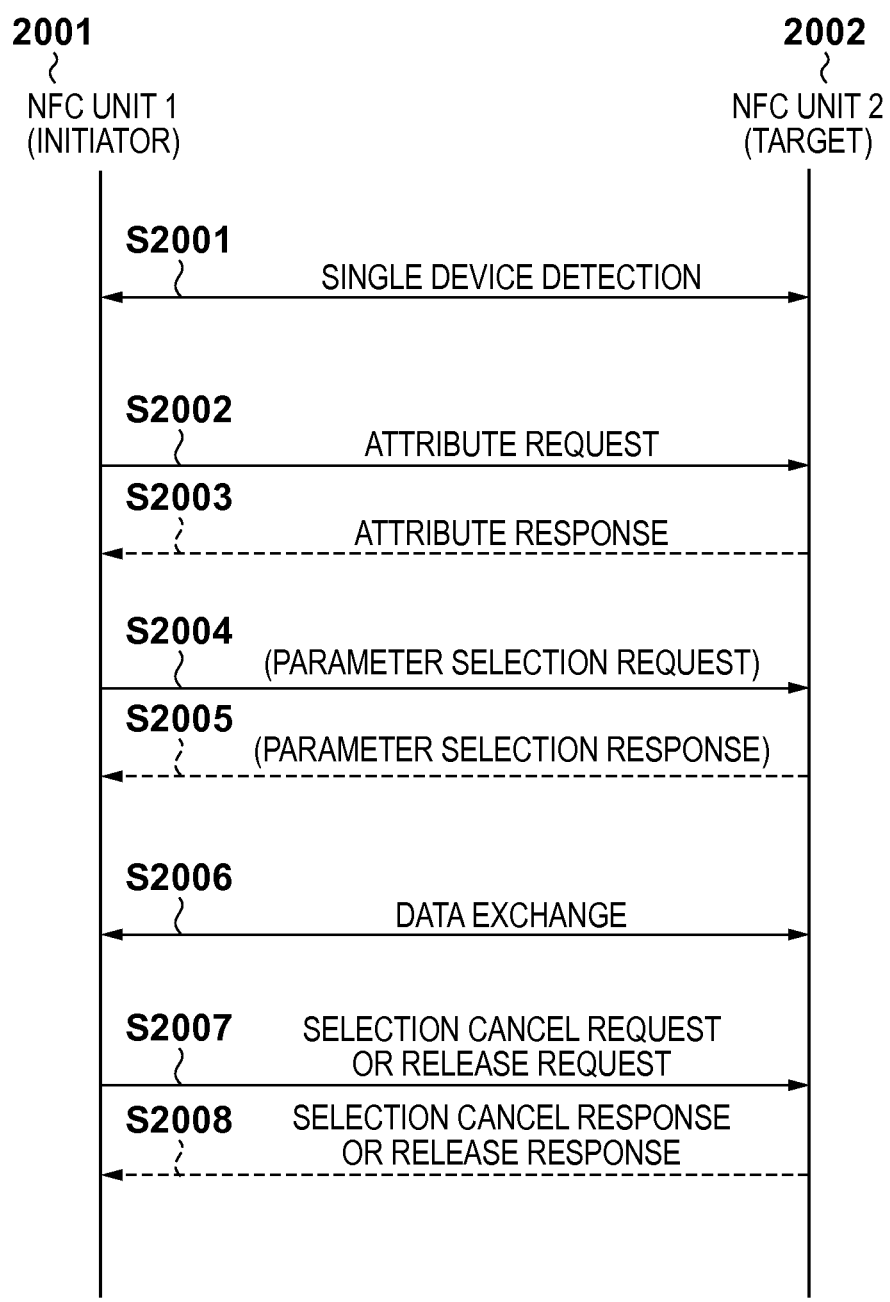
FIG. 20 is a sequence chart showing the sequence of performing data exchange in the passive mode.

FIG. 20 is a sequence chart showing the sequence of performing data exchange in the passive mode. A case will be described below in which a first NFC unit 2001 operates as the initiator, and a second NFC unit 2002 operates as a target (target mode). In step S2001, the first NFC unit 2001 performs single device detection and specifies the second NFC unit 2002. That is, in step S2001, the first NFC unit 2001 and the second NFC unit 2002 detect each other's existence. In step S2002, the first NFC unit 2001 transmits the identifier of its own, the bit transmission rate of transmission/reception, the effective data length, and the like to the partner as an attribute request. The attribute request has general purpose bytes which can arbitrarily be selected and used. Upon receiving an effective attribute request, the second NFC unit 2002 transmits an attribute response in step S2003. Transmission from the second NFC unit 2002 is done by load modulation. Data transmission by load modulation is indicated by a dotted arrow in FIG. 20.

After confirming an effective attribute response, the first NFC unit 2001 can change the parameters of the subsequent transmission protocol by transmitting a parameter selection request in step S2004. Parameters included in the parameter selection request are, for example, the transmission rate and the effective data length. Upon receiving an effective parameter selection request, the second NFC unit 2002 transmits a parameter selection response in step S2005 so as to change the parameters. Note that steps S2004 and S2005 may be omitted if the parameter change is not to be performed.

In step S2006, the first NFC unit 2001 and the second NFC unit 2002 exchange data by a data exchange request and a data exchange response. At the time of the data exchange request and the data exchange response, information for an application provided in the communication partner or the like can be transmitted as data. If the data size is large, the data can divisionally be transmitted.

When the data exchange has ended, the process advances to step S2007, and the first NFC unit 2001 transmits one of a selection cancel request and a release request. When the selection cancel request is transmitted, the second NFC unit 2002 transmits a selection cancel response in step S2008. Upon receiving the selection cancel response, the first NFC unit 2001 releases the attribute representing the second NFC unit 2002, and the process returns to step S2001. When the release request is transmitted, the second NFC unit 2002 transmits a release response in step S2008 and returns the initial state. Upon receiving the release response, the first NFC unit 2001 may return to the initial state because the target is completely released.

Figure 21:
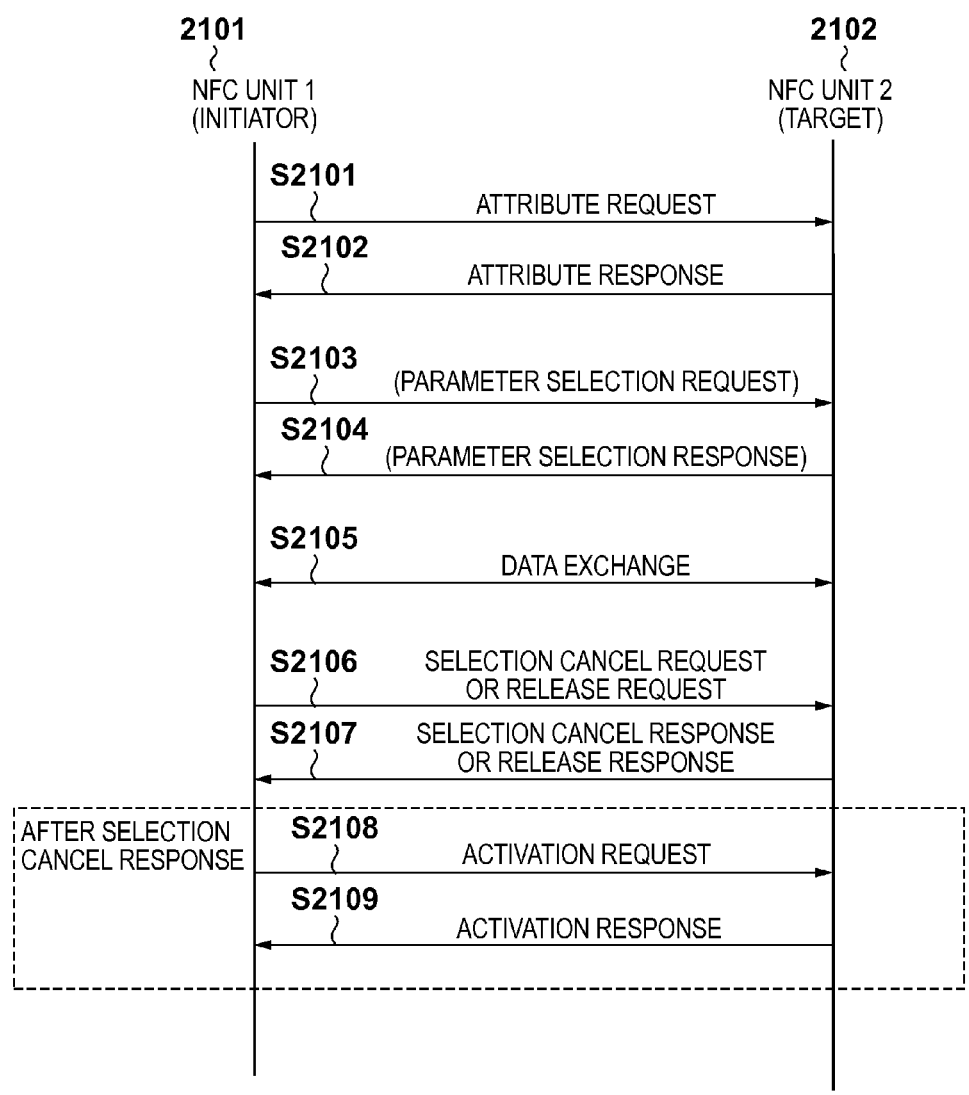
FIG. 21 is a sequence chart showing the sequence of performing data exchange in the active mode.

FIG. 21 is a sequence chart showing the sequence of performing data exchange in the active mode. A case will be described below in which a first NFC unit 2101 operates as the initiator, and a second NFC unit 2102 operates as a target. In step S2101, the first NFC unit 2101 transmits the identifier of its own, the bit transmission rate of transmission/reception, the effective data length, and the like as an attribute request. Upon receiving an effective attribute request, the second NFC unit 2102 transmits an attribute response in step S2102. Transmission from the second NFC unit 2102 is done by an RF field generated by itself. For this reason, the first and second NFC units stop outputting the RF fields when ending data transmission.

After confirming an effective attribute response, the first NFC unit 2101 can change the parameters of the transmission protocol by transmitting a parameter selection request in step S2103. Parameters included in the parameter selection request are the transmission rate and the effective data length. Upon receiving an effective parameter selection request, the second NFC unit 2102 transmits a parameter selection response in step S2104 so as to change the parameters. Note that steps S2103 and S2104 may be omitted if the parameter change is not to be performed, as in the passive mode.

In step S2105, the first NFC unit 2101 and the second NFC unit 2102 exchange data by a data exchange request and a data exchange response. At the time of the data exchange request and the data exchange response, information for an application or the like can be transmitted as data. If the data size is large, the data can divisionally be transmitted. Note that when performing communication in the active mode in FIG. 21, the NFC unit 2102 can transmit data by sending an RF field by itself.

When the data exchange has ended, the process advances to step S2106, and the first NFC unit 2101 transmits one of a selection cancel request and a release request. When the selection cancel request is transmitted, the second NFC unit 2102 transmits a selection cancel response in step S2107. Upon receiving the selection cancel response, the first NFC unit 2101 releases the attribute representing the second NFC unit 2102. After that, in step S2108, the first NFC unit 2101 transmits an activation request to another target whose identifier is known. Upon receiving the activation request, the target transmits an activation response in step S2109, and the process returns to step S2101. When the release request is transmitted in step S2106, the second NFC unit 2102 transmits a release response in step S2107 and returns the initial state. Upon receiving the release response, the first NFC unit 2101 may return to the initial state because the target is completely released.

Figure 22:
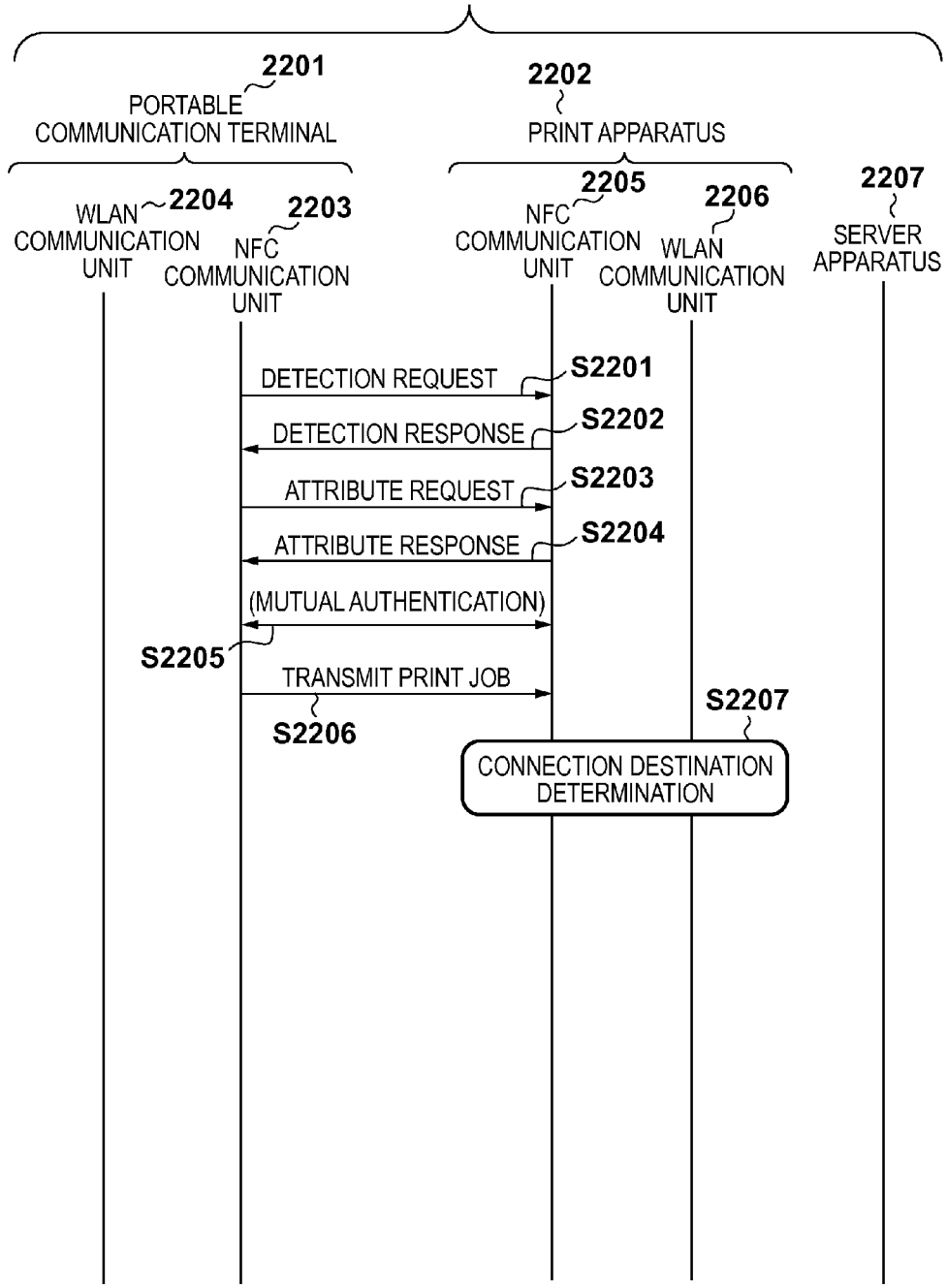
FIG. 22 is a sequence chart showing the sequence of performing data transfer while switching the communication method.

FIG. 22 is a sequence chart showing the sequence of performing data transfer while switching between NFC and WLAN. The communication speed of NFC is relatively as low as several hundred bps. WLAN communication can be faster than NFC communication. Authentication is easier in NFC than in WLAN. For these reasons, authentication or the like can be done using NFC, and data of a large amount can efficiently be transferred by WLAN at a high speed.

FIG. 22 illustrates an example in which a portable communication terminal transmits a print job to a print apparatus. Image data to be printed exists in a portable communication terminal 2201 or a server apparatus 2207 depending on the print job. FIG. 22 explains the procedure of processing until the print apparatus determines (data obtaining destination determination) the storage location of image data. In this embodiment, a print job will be described as an example of a job. However, the job is not limited to printing and may be another type of processing. The MFP 300 may obtain execution target data from the portable communication terminal 200 or the server apparatus 101 based on the job and execute the other type of processing.

In step S2201, to establish NFC communication, an NFC communication unit 2203 serves as an initiator and detects an NFC communication unit 2205 as a target. If the NFC communication unit 2205 is correctly detected, the NFC communication unit 2205 transmits a detection response in step S2202. Although FIG. 22 illustrates a case in which the portable communication terminal 2201 serves as the initiator, a print apparatus 2202 may become the initiator based on an input from the operation display unit 305 or the like. Upon correctly receiving the detection response, the NFC communication unit 2203 transmits an attribute request in step S2203 to do NFC communication. Upon receiving the attribute request, the NFC communication unit 2205 returns an attribute response in step S2204. At this tine, the NFC-IDs of the initiator and target are transmitted by the attribute request and the attribute response, respectively, and the partners are specified by the NFC-IDs.

In step S2205, mutual authentication is performed so that an encryption key for data encryption and the like can be transferred. Note that if transfer of the encryption key is not necessary, mutual authentication need not be performed. The user selects, on the terminal, image data or the like to be printed by an application on a portable communication terminal 2401, generates a print job using the print function or the like (job generation), and transmits it to a print apparatus 2402. In step S2206, an NFC communication unit 2305 receives the generated print job from an NFC communication unit 2303 by NFC communication (first communication) (job reception).

The print job transmitted from the portable communication terminal to the print apparatus in step S2206 includes information necessary for printing, such as print settings, the image data name, path information (specific information) to the image data, and if the image data exists in a storage location other than the portable communication terminal 2201, the information of the storage location, and the authentication information of the storage location. The print settings include information necessary for print settings, such as the print size and print quality. The storage location is the portable communication terminal 2201 or the server apparatus 2207. If the storage location is the portable communication terminal 2201, the portable communication terminal 2201 transmits the print job including information necessary for establishment of WLAN communication (second communication) and information of an access key to the portable communication terminal 2201 in step S2206 (connection information reception). On the other hand, if the storage location is the server apparatus 2207, the portable communication terminal 2201 transmits the print job including information of an access key to the server apparatus 2207. In step S2207, the connection destination is changed in accordance with the received print job.

In this embodiment, if the print job is a job to print image data in the server apparatus, the portable communication terminal can include information used for WLAN communication with the portable communication terminal itself in addition to information used for WLAN communication with the server apparatus. In this case, the print apparatus can do WLAN connection to both the server apparatus and the portable communication terminal based on the information included in the print job. It is therefore possible to, for example, obtain print processing target data from the server apparatus using WLAN and execute printing and also transmit the printing state to the portable communication terminal using WLAN.

Figure 23:
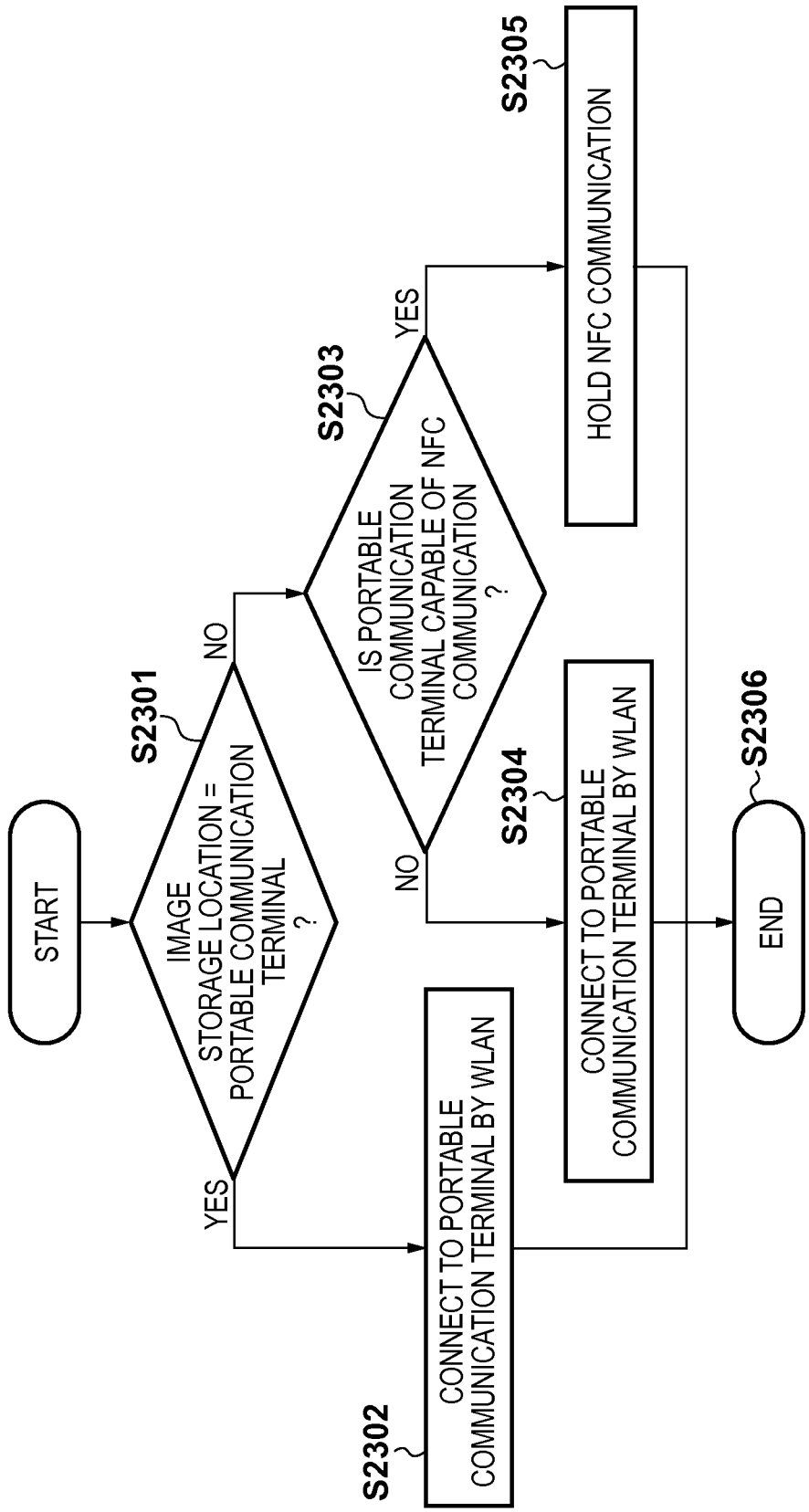
FIG. 23 is a flowchart for explaining the detailed procedure of step S2207.

Details of step S2207 will be described with reference to FIG. 23. Each process shown in FIG. 23 is executed by the CPU 902 of the print apparatus 2202. In step S2301, the CPU executes the print job received in step S2206 (job execution) and determines whether the storage location of the image data that is the print target of the print job is the portable communication terminal 2201 or the server apparatus 2207. Upon determining that the storage location is the portable communication terminal 2201, the process advances to step S2302. Upon determining that the storage location is the server apparatus 2207, the process advances to step S2303. In step S2302, the NFC communication with the portable communication terminal 2201 is disconnected, and the print apparatus is connected to the portable communication terminal 2201 by WLAN. Details will be described later with reference to FIG. 24.

In step S2303, the CPU determines whether the print apparatus 2202 can communicate with the portable communication terminal 2201 via NFC. For example, if the portable communication terminal 2201 remains in contact with the print apparatus 2202, the CPU determines that communication is possible. On the other hand, if the user has carried the portable communication terminal away from the print apparatus 2202, the CPU determines that communication is impossible. Upon determining that communication is impossible, the process advances to step S2304 to connect the print apparatus to the portable communication terminal 2201 by WLAN while establishing connection to the server apparatus 2207 by WLAN. Details will be described later with reference to FIG. 25. Upon determining that communication is possible, the process advances to step S2305 to hold NFC communication with the portable communication terminal 2201 while establishing connection to the server apparatus 2207. Details will be described later with reference to FIG. 26. The processing ends in step S2306.

Figure 24:
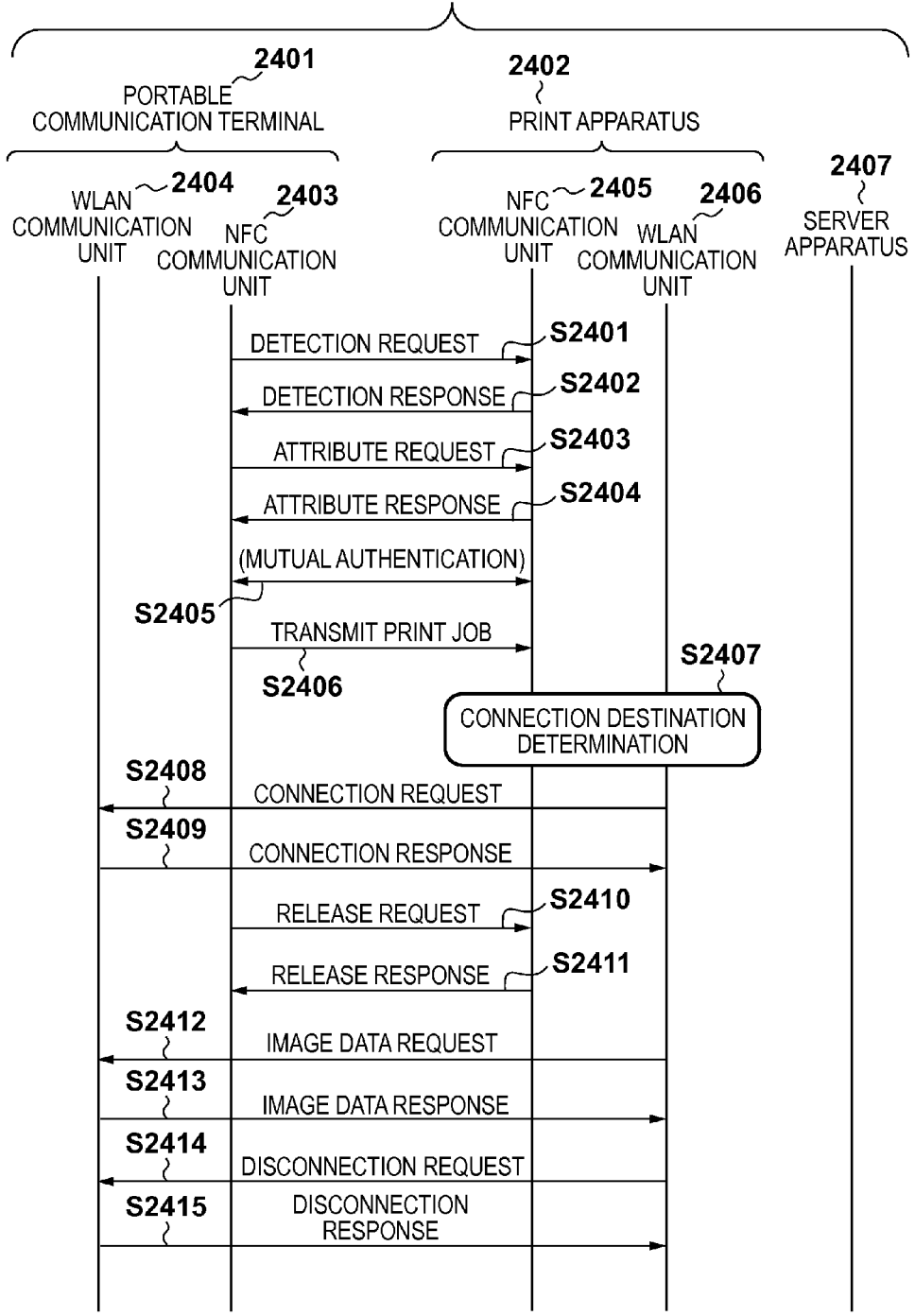
FIG. 24 is a sequence chart showing processing when the processing of step S2302 has been selected.

FIG. 24 is a sequence chart showing processing when the processing in step S2302 has been selected in step S2207 of FIG. 22, that is, in FIG. 23. Steps S2401 to S2407 in FIG. 24 are the same as steps S2201 to S2207 in FIG. 22. In step S2408, a WLAN communication unit 2406 sends a connection request to a WLAN communication unit 2404. At this time, authentication is performed using the access key received in step S2406, thereby returning a connection response in step S2409 and establishing WLAN connection to the portable communication terminal 2201. After the NFC communication has been switched to the WLAN communication, an NFC communication unit 2403 transmits a release request in step S2410. Upon receiving the release request, an NFC communication unit 2405 transmits a release response in step S2411 to end the NFC communication.

From step S2412, WLAN communication is performed. First, in step S2412, the WLAN communication unit 2406 requests image data and confirms with the WLAN communication unit 2404 whether data transfer is possible. The contents to be confirmed here include, for example, the capacity of free space to temporarily save the image data to be transferred to the print apparatus 2402. Upon receiving the image data request and the confirmation request and then determining that image data transmission is possible, the WLAN communication unit 2404 transmits the image data in step S2413.

If the image could normally be received, the NFC communication unit 2405 transmits a disconnection request in step S2414. In step S2415, the WLAN communication unit 2404 returns a disconnection response and ends the communication. The timing the print apparatus 2402 sends the disconnection request (step S2414) can be either before or after completion of printing. When disconnecting the communication after completion of printing, the printing execution result can be notified. When disconnecting the communication before completion of printing, the consumed power and the communication charge can be saved. As described above, in this embodiment, when communicating image data of a large amount can be transferred using a faster communication protocol. The communication by the WLAN communication unit shown in FIG. 24 can be either communication via a network or peer to peer communication.

Figure 25:
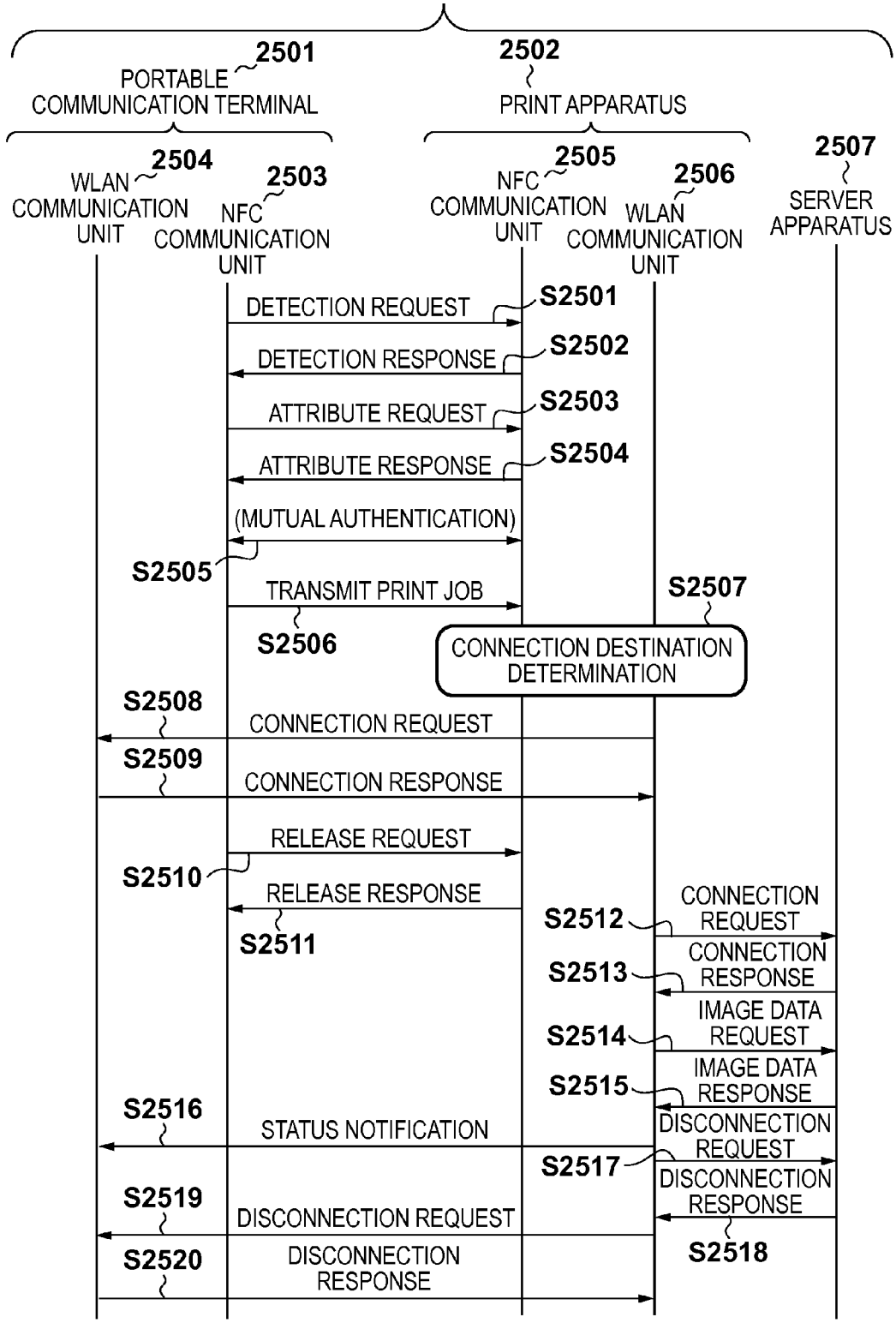
FIG. 25 is a sequence chart showing processing when the processing of step S2304 has been selected.

FIG. 25 is a sequence chart showing processing when the processing in step S2304 has been selected in step S2207 of FIG. 22, that is, in FIG. 23. Steps S2501 to S2507 in FIG. 25 are the same as steps S2201 to S2207 in FIG. 22. In step S2508, a WLAN communication unit 2506 sends a connection request to a WLAN communication unit 2504. At this time, authentication is performed using the access key received in step S2506, thereby returning a connection response in step S2509 and establishing WLAN connection to a portable communication terminal 2502. After the NFC communication has been switched to the WLAN communication, an NFC communication unit 2503 transmits a release request in step S2510. Upon receiving the release request, an NFC communication unit 2505 transmits a release response in step S2511 to end the NFC communication with the portable communication terminal 2502. Note that if the NFC communication has already been disconnected as the NFC communication units have moved away from each other, steps S2510 and S2511 need not be executed.

In step S2512, the WLAN communication unit 2506 sends a connection request to a server apparatus 2507. At this time, authentication is performed using the access key received in step S2506, thereby returning a connection response in step S2513 and establishing WLAN connection. The processes of steps S2514, S2515, S2517, and S2518 are the same as those of steps S2412, S2413, S2414, and S2415, respectively.

If an event occurs during execution of printing, the WLAN communication unit 2506 transmits a status notification each time (step S2516), thereby notifying the printing state. Examples of the event are a state transition event such as an image data obtaining completion notification or a printing completion notification from the server apparatus 2507, and an error event such as a paper jam or a communication error.

As described above, in this embodiment, the WLAN communication unit 2506 switches the communication with a portable communication terminal 2501 from NFC communication to WLAN communication while communicating with the server apparatus 2507. Hence, even if the portable communication terminal 2501 has moved away from the MFP 300 by a distance equal to or more than the NFC communication range after transmitting a print job, communication between the MFP 300 and the portable communication terminal 2501 can be performed within the WLAN communication range. It is therefore possible to cause the user of the portable communication terminal 2501 to appropriately recognize the printing state even after print job transmission by the NFC communication.

FIG. 26 is a sequence chart showing processing when the processing in step S2305 has been selected in step S2207 of FIG. 22, that is, in FIG. 23. Steps S2601 to S2607 in FIG. 26 are the same as steps S2201 to S2207 in FIG. 22. In FIG. 25, communication between a portable communication terminal 2601 and a print apparatus 2602 is switched from NFC communication to WLAN communication. In FIG. 26, however, the portable communication terminal 2601 and the print apparatus 2602 hold NFC communication.

Steps S2608, S2609, S2611, S2612, S2613, and S2614 are the same as steps S2512, S2513, S2514, S2515, S2517, and S2518, respectively. In FIG. 26, in step S2610, an NFC communication unit 2605 transmits a status notification to an NFC communication unit 2603. The notification contents of the status notification in step S2610 are the same as those of the status notification in step S2516. In FIG. 26, the status notification may be transmitted after image data transmission/reception in step S2611 and S2612. In step S2615, the NFC communication unit 2603 transmits a release request to the NFC communication unit 2605. Upon receiving the release request, the NFC communication unit 2605 transmits a release response in step S2616 to end the NFC communication.

As described above, in the processing shown in FIG. 26, if the NFC communication with the portable communication terminal 2601 can be continued, it is possible to notify the portable communication terminal 2601 of the printing state by NFC communication. Hence, the user of the portable communication terminal 2601 can recognize the printing state without switching the communication between the print apparatus and the portable communication terminal 2601. This is a case in which, for example, the user leaves the portable communication terminal on the print apparatus after print job submission.

As described above, in this embodiment, upon receiving a print job from a portable information terminal by NFC communication, the print apparatus can communicate with the server apparatus 2507 by WLAN in accordance with the print job and simultaneously switch the communication with the portable communication terminal from NFC communication to WLAN communication.

Hence, even if the portable communication terminal has moved away from the print apparatus by a distance equal to or more than the NFC communication range after transmitting a print job, communication between the print apparatus and the portable communication terminal can be performed within the WLAN communication range. It is therefore possible to cause the user of the portable communication terminal 2501 to appropriately recognize the printing state even after print job transmission by the NFC communication.

In this embodiment, when it is determined in step S2303 that the communication between the portable information terminal and the print apparatus is impossible (for example, the portable information terminal has been carried away), WLAN communication is performed, as in step S2304. However, the present invention is not limited to this. Authentication processing or communication establishment of WLAN may be performed during a time in which the NFC communication is established. In this case, even if NFC communication has become impossible, WLAN communication can be performed properly and quickly.

In this embodiment, NFC has been explained as an example of short distance wireless communication. However, the present invention is not limited to this, and any other communication method is also usable. In addition, WLAN or Bluetooth® has been explained as an example of wireless communication used when NFC communication with the portable communication terminal has become impossible. However, any other communication method is also usable. Any communication method having a communication range wider than that of NFC enables communication even if NFC communication has become impossible as the portable information terminal moves away.

In the above description, wireless communication such as NFC or WLAN has been exemplified as the communication method. However, the present invention is not limited to this, and wired communication is also usable. In addition, when, for example, a print job is sent to the print apparatus by wired communication, and the wired communication is then disconnected, information concerning printing may be transmitted by another wired communication.

In the above-described embodiment, the print job transmitted by the portable information terminal is a job that causes the print apparatus to obtain print target image data from the server. However, the present invention is not limited to this. For example, the job may cause the print apparatus to print data stored in it. In this case as well, the portable information terminal can be notified of information such as the printing state or a print error in the print apparatus.

In the above embodiment, printing by the print apparatus has been exemplified. However, the present invention is not limited to this, and various kinds of apparatuses may be caused to execute various kinds of processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048621, filed Mar. 5, 2012, which is hereby incorporated by reference herein in its entirety.

What is claimed is:

1. A printer capable of performing communication using each of a first communication method and a second communication method having a communication range wider than that of the first communication method, comprising:
at least one processor; and
at least one memory configured to store a program which can be executed by the at least one processor,
wherein the at least one processor receives, from an external apparatus by the first communication method, both of first information used to communicate with the external apparatus by the second communication method and second information used to access to a storage location of processing target data, in response to establishment of communication with the external apparatus by the first communication method, and
the at least one processor acquires the processing target data, by accessing to the storage location by the second communication method based on the received second information, and;
the at least one processor transfers, by the second communication method based on the received first information, information about printing of an image corresponding to the acquired processing target data, to the external apparatus.

2. The printer according to claim 1, wherein, in a case where the second information specifies a second external apparatus which is different from the external apparatus and which stores the processing target data, the at least one processor acquires the processing target data from the second external apparatus specified by the second information.

3. The printer according to claim 1, wherein, in a case where the second information specifies the external apparatus storing the processing target data, the at least one processor acquires the processing target data from the external apparatus specified by the second information.

4. The printer according to claim 1, wherein the second information is authentication information used to authenticate access by the printer to the storage location.

5. The printer according to claim 1, wherein the first communication method is NFC (Near Field Communication).

6. The printer according to claim 1, wherein the second communication method is a wireless LAN.

7. The printer according to claim 1, wherein the at least one processor executes printing of the image corresponding to the acquired processing target data.

8. The printer according to claim 7, wherein the at least one processor transfers the information about completion of the printing of the image or an error of the printing of the image.

9. A method of controlling a printer capable of performing communication using each of a first communication method and a second communication method having a communication range wider than that of the first communication method, comprising:
a reception step of receiving, from an external apparatus by the first communication method, both of first information used to communicate with the external apparatus by the second communication method and second information used to access to a storage location of processing target data, in response to establishment of communication with the external apparatus by the first communication method; and
a step of acquiring the processing target data, by accessing to the storage location by the second communication method based on the second information received by said reception step and
a step of transferring, by the second communication method based on the first information received in said reception step, information about execution of printing of an image corresponding to the acquired processing target data, to the external apparatus.

10. The method according to claim 9, wherein, in a case where the second information specifies a second external apparatus which is different from the external apparatus and which stores the processing target data, the processing target data is acquired from the second external apparatus specified by the second information.

11. The method according to claim 9, wherein, in a case where the second information specifies the external apparatus storing the processing target data, the processing target data is acquired from the external apparatus specified by the second information.

12. The method according to claim 9, wherein the second information is authentication information used to authenticate access by the printer to the storage location.

13. The method according to claim 9, wherein the first communication method is NFC (Near Field Communication).

14. The method according to claim 9, wherein the second communication method is a wireless LAN.

15. The method according to claim 9, wherein printing of the image corresponding to the acquired processing target data is executed by the printer.

16. The method according to claim 15, wherein the external apparatus is notified of the information about completion of the printing of the image or an error of the printing of the image, which is transferred from the printer.

17. A non-transitory computer-readable storage medium storing a program that causes a computer to execute a method of controlling a printer capable of performing communication using each of a first communication method and a second communication method having a communication range wider than that of the first communication method:

a reception step of receiving, from an external apparatus by the first communication method, both of first information used to communicate with the external apparatus by the second communication method and second information used to access to a storage location of processing target data in response to establishment of communication with the external apparatus by the first communication method; and a step of acquiring the processing target data, by accessing to the storage location by the second communication method based on the second information received by said reception unit and a step of transferring, by the second communication method based on the first information received in the reception step, information about printing of an image corresponding to the acquired processing target data, to the external apparatus.

* * * * *